(12) United States Patent
Zhou et al.

(10) Patent No.: US 12,177,710 B2
(45) Date of Patent: Dec. 24, 2024

(54) DEVICE CONTROL METHOD AND SYSTEM, AND RELATED APPARATUS

(71) Applicant: HUAWEI TECHNOLOGIES CO., LTD., Guangdong (CN)

(72) Inventors: Ming Zhou, Shanghai (CN); Junxin Lu, Shanghai (CN); Shaolong Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 17/629,015

(22) PCT Filed: Jul. 20, 2020

(86) PCT No.: PCT/CN2020/102978
§ 371 (c)(1),
(2) Date: Jan. 21, 2022

(87) PCT Pub. No.: WO2021/013121
PCT Pub. Date: Jan. 28, 2021

(65) Prior Publication Data
US 2022/0272563 A1 Aug. 25, 2022

(30) Foreign Application Priority Data

Jul. 23, 2019 (CN) .......................... 201910664810.X

(51) Int. Cl.
*H04W 52/02* (2009.01)
*H04B 7/0404* (2017.01)
(Continued)

(52) U.S. Cl.
CPC ...... *H04W 28/0221* (2013.01); *H04B 7/0404* (2013.01); *H04B 7/0413* (2013.01);
(Continued)

(58) Field of Classification Search
CPC ......... H04W 28/0221; H04W 52/0206; H04W 76/10; H04W 84/12; H04W 48/02;
(Continued)

(56) References Cited

U.S. PATENT DOCUMENTS 8,830,971 B1 * 9/2014 Shipley ................. H04W 84/12
370/338
8,903,458 B1 * 12/2014 Ho ..................... H04W 52/0261
455/574

(Continued)

FOREIGN PATENT DOCUMENTS

CN 1411638 A 4/2003
CN 105392162 A 3/2016
(Continued)

OTHER PUBLICATIONS

Office Action issued in CN201910664810.X, dated Jun. 2, 2021, 8 pages.
International Search Report and Written Opinion issued in PCT/CN2020/102978, dated Oct. 13, 2020, 9 pages.
(Continued)

*Primary Examiner* — Kwang B Yao
*Assistant Examiner* — Bradley D Lytle, Jr.

(57) ABSTRACT

A device control system is disclosed. The system includes a first mobile terminal and a second mobile terminal. After enabling a wireless hotspot function, the first mobile terminal establishes a wireless fidelity (Wi-Fi) connection to the second mobile terminal, and transmits data to the second mobile terminal in a MIMO Wi-Fi antenna working mode. The first mobile terminal may monitor a remaining battery level and/or a device temperature of the mobile terminal. When the remaining battery level is less than a first battery level threshold and/or the device temperature is greater than a first temperature threshold, the first mobile terminal switches the Wi-Fi antenna working mode as SISO, limits a (Continued)

maximum forwarding rate of a TCP packet or a UDP packet to a first rate, and/or no longer responds to a probe request. In this way, power consumption of the first mobile terminal is reduced.

20 Claims, 11 Drawing Sheets

(51) Int. Cl.
*H04B 7/0413* (2017.01)
*H04W 28/02* (2009.01)
*H04W 76/10* (2018.01)
*H04W 84/12* (2009.01)

(52) U.S. Cl.
CPC ....... *H04W 52/02* (2013.01); *H04W 52/0206* (2013.01); *H04W 52/0251* (2013.01); *H04W 76/10* (2018.02); *H04W 84/12* (2013.01)

(58) Field of Classification Search
CPC ..... H04W 88/06; H04W 28/02; H04W 52/02; H04W 76/14; H04W 52/0251; H04W 28/0215; H04W 52/0225; H04B 7/0413; H04B 7/0689; H04B 7/0404; Y02D 30/70
See application file for complete search history.

(56) References Cited

U.S. PATENT DOCUMENTS

| | | | |
|---|---|---|---|
| 2011/0205888 A1* | 8/2011 | Laitinen | H04L 47/32 370/230 |
| 2014/0362723 A1 | 12/2014 | Garg et al. | |
| 2016/0360489 A1* | 12/2016 | Boodannavar | H04B 7/0413 |
| 2017/0195893 A1* | 7/2017 | Lee | H04W 72/046 |
| 2017/0222710 A1* | 8/2017 | Eitan | H04B 7/0452 |
| 2021/0029643 A1* | 1/2021 | Stauffer | H04W 76/27 |

FOREIGN PATENT DOCUMENTS

| | | |
|---|---|---|
| CN | 105676992 A | 6/2016 |
| CN | 106412930 A | 2/2017 |
| CN | 108353265 A | 7/2018 |
| CN | 108449787 A | 8/2018 |
| CN | 108475097 A | 8/2018 |
| CN | 108990105 A | 12/2018 |
| CN | 109246798 A | 1/2019 |
| CN | 109362121 A | 2/2019 |
| JP | 2015080133 A | 4/2015 |
| KR | 20150012644 A | 2/2015 |

OTHER PUBLICATIONS

Office Action issued in CN201910664810.X, dated May 26, 2022, 6 pages.

* cited by examiner

DEVICE CONTROL METHOD AND SYSTEM, AND RELATED APPARATUS

This application is a national stage of International application No. PCT/CN2020/102978, filed on Jul. 20, 2020, which claims priority to Chinese patent application No. 201910664810.X, filed on Jul. 23, 2019. Both of the aforementioned applications are hereby incorporated by reference in their entireties.

TECHNICAL FIELD

This application relates to the field of short-range wireless communications technologies, and in particular, to a device control method and system, and a related apparatus for short-range wireless communications.

BACKGROUND

As tariffs of cellular data services continuously decrease, a user scenario in which a wireless fidelity (Wi-Fi) network is shared by using a Wi-Fi hotspot (access point, AP) function of a mobile terminal such as a mobile phone appears more frequently. However, enabling the Wi-Fi hotspot function may significantly increase power consumption of the mobile terminal, and a battery capacity of the mobile terminal is limited. Therefore, enabling the Wi-Fi hotspot function affects the use duration of the mobile terminal device.

Currently, after a mobile terminal enables a Wi-Fi hotspot function, the mobile terminal needs to respond at any time to a probe request sent by each Wi-Fi STA (station) over an air interface, and needs to periodically send a management frame such as a beacon. As a result, power consumption is high.

SUMMARY

This application provides a device control method and a related apparatus, so that a Wi-Fi hotspot working mode can be dynamically adjusted based on conditions such as a battery level status and a device temperature of a mobile terminal, to reduce power consumption of the mobile terminal.

According to a first aspect, this application provides a device control system, including a first mobile terminal and a second mobile terminal. The first mobile terminal is configured to: after the first mobile terminal enables a wireless hotspot function, establish a wireless fidelity (Wi-Fi) connection to the second mobile terminal, and transmit data to the second mobile terminal in a multiple-input multiple-output (MIMO) Wi-Fi antenna working mode. The first mobile terminal is further configured to monitor a remaining battery level and/or a device temperature of the mobile terminal. The first mobile terminal is further configured to: when the remaining battery level is less than a first battery level threshold and/or the device temperature is greater than a first temperature threshold, switch the Wi-Fi antenna working mode to single-input single-output (SISO), and/or limit a maximum forwarding rate of a transmission control protocol (TCP) packet or a user datagram protocol (UDP) packet to be a first rate, and/or no longer respond to a probe request. The second mobile terminal is configured to access the internet by using the first mobile terminal connected through Wi-Fi.

According to the control system provided in this application, after the first mobile terminal enables the Wi-Fi hotspot function, the first mobile terminal may dynamically adjust a working mode of the first mobile terminal based on a battery level status and/or the device temperature. When the remaining battery level is less than the first battery level threshold and/or the device temperature is greater than the first temperature threshold, the first mobile terminal switches the Wi-Fi antenna working mode to single-input single-output (SISO), and/or limits the maximum forwarding rate of the transmission control protocol (TCP) packet or the user datagram protocol (UDP) packet to less than the first rate, and/or no longer responds to the probe request. Therefore, power consumption of the first mobile terminal is reduced.

In a possible implementation, the first mobile terminal is further configured to: when a quantity of terminal devices connected to the first mobile terminal through Wi-Fi reaches a specified value, no longer respond to the probe request. In this way, the quantity of devices accessed by the first mobile terminal through Wi-Fi can be limited, to reduce power consumption.

In a possible implementation, the first mobile terminal is further configured to: when the remaining battery level is less than a second battery level threshold, limit the maximum forwarding rate of the TCP packet or the UDP packet to less than a second rate. The second battery level threshold is less than the first battery level threshold, and the second rate is less than the first rate. In this way, the maximum forwarding rate of the TCP packet or the UDP packet is adjusted in a gradient manner based on the remaining battery level, so that transmission performance and power consumption of the first mobile terminal can be balanced.

In a possible implementation, the first mobile terminal is further configured to: when the device temperature is greater than a second temperature threshold, limit the maximum forwarding rate of the TCP packet or the UDP packet to less than a second rate. The second temperature threshold is greater than the first temperature threshold. In this way, the maximum forwarding rate of the TCP packet or the UDP packet is adjusted in a gradient manner based on the device temperature, so that transmission performance and power consumption of the first mobile terminal can be balanced.

In a possible implementation, the first mobile terminal is further configured to: when detecting that a preset high power consumption application is running, switch the Wi-Fi antenna working mode to SISO, and/or limit the maximum forwarding rate of the TCP packet or the UDP packet to less than the first rate, and/or no longer respond to the probe request. In this way, when the high power consumption application is running, the first mobile terminal can reduce a quantity of working Wi-Fi antennas, limit the forwarding rate of the TCP packet or the UDP packet, and no longer respond to the probe request, to reduce power consumption of the first mobile terminal.

In a possible implementation, the first mobile terminal is further configured to: before the first mobile terminal switches the Wi-Fi antenna working mode to SISO, send a first switching request to the second mobile terminal. The second mobile terminal is further configured to switch the Wi-Fi working mode to SISO in response to the first switching request.

In a possible implementation, the specified value includes a maximum access quantity supported by a Wi-Fi chip of the first mobile terminal. In this way, due to a limitation of the Wi-Fi chip or the like, there is a maximum quantity of (for example, a maximum of eight) STAs accessed by the first mobile terminal serving as a Wi-Fi hotspot AP. When the specified quantity is set to the maximum quantity of STAs accessed by the first mobile terminal, the first mobile terminal cannot actually access more STAs. Therefore, a response to the probe request is limited, and an association success rate of the Wi-Fi hotspot is not affected.

According to a second aspect, this application provides a chip system, disposed in a first mobile terminal, and including a processor and a wireless fidelity (Wi-Fi) chip. The chip system is disposed in the first mobile terminal. The Wi-Fi chip is configured to: after a wireless hotspot function is enabled, establish a wireless fidelity (Wi-Fi) connection to a second mobile terminal, and transmit data to the second mobile terminal in a multiple-input multiple-output (MIMO) Wi-Fi antenna working mode. The processor is configured to: after the wireless hotspot function is enabled, indicate a power management module to monitor a remaining battery level of the first mobile terminal, and/or indicate a temperature sensor to monitor a device temperature of the first mobile terminal. The processor is further configured to: when the remaining battery level is less than a first battery level threshold and/or the device temperature is less than a first device temperature threshold, send a first instruction to the Wi-Fi chip. The Wi-Fi chip is further configured to: in response to the first instruction, switch to a single-input single-output (SISO) Wi-Fi antenna working mode, and/or limit a maximum forwarding rate of a TCP packet or a UDP packet to less than a first rate, and/or no longer respond to a probe request.

According to the example chip system provided in this application, after the first mobile terminal enables the Wi-Fi hotspot function, the chip system may dynamically adjust a working mode of the first mobile terminal based on a battery level status and/or the device temperature. When the remaining battery level is less than the first battery level threshold and/or the device temperature is greater than the first temperature threshold, the chip system switches the Wi-Fi antenna working mode to single-input single-output (SISO), and/or limits the maximum forwarding rate of the transmission control protocol (TCP) packet or the user datagram protocol (UDP) packet to less than the first rate, and/or no longer responds to the probe request. Therefore, power consumption of the first mobile terminal is reduced.

In a possible implementation, the processor is further configured to: when a quantity of terminal devices connected to the first mobile terminal through Wi-Fi reaches a specified value, send a second instruction to the Wi-Fi chip. The Wi-Fi chip is further configured to no longer respond to the probe request in response to the second instruction. In this way, the quantity of devices accessed by the first mobile terminal through Wi-Fi can be limited, to reduce power consumption.

In a possible implementation, the processor is further configured to: when the remaining battery level is less than a second battery level threshold, send a third instruction to the Wi-Fi chip. The Wi-Fi chip is further configured to limit the maximum forwarding rate of the TCP packet or the UDP packet to a second rate in response to the third instruction. The second battery level threshold is less than the first battery level threshold, and the second rate is less than the first rate. In this way, the maximum forwarding rate of the TCP packet or the UDP packet is adjusted in a gradient manner based on the remaining battery level, so that transmission performance and power consumption of the first mobile terminal can be balanced.

In a possible implementation, the processor is further configured to: when the device temperature is greater than a second temperature threshold, send a fourth instruction to the Wi-Fi chip. The Wi-Fi chip is further configured to limit the maximum forwarding rate of the TCP packet or the UDP packet to a second rate in response to the fourth instruction, where the second temperature threshold is greater than the first temperature threshold, and the second rate is less than the first rate. In this way, the maximum forwarding rate of the TCP packet or the UDP packet is adjusted in a gradient manner based on the device temperature, so that transmission performance and power consumption of the first mobile terminal can be balanced.

In a possible implementation, the processor is further configured to: when detecting that a preset high power consumption application is running, send a fifth instruction to the Wi-Fi chip. The Wi-Fi chip is further configured to: in response to the fifth instruction, switch the Wi-Fi antenna working mode to SISO, and/or limit the maximum forwarding rate of the TCP packet or the UDP packet to the first rate, and/or no longer respond to the probe request. In this way, when the high power consumption application is running, the Wi-Fi chip can reduce a quantity of working Wi-Fi antennas, limit the forwarding rate of the TCP packet or the UDP packet, and no longer respond to the probe request, to reduce power consumption of the first mobile terminal.

In a possible implementation, the processor is further configured to: before the Wi-Fi chip switches the Wi-Fi antenna working mode to SISO, send a sixth instruction to the Wi-Fi chip. The Wi-Fi chip is further configured to send a first switching request to the second mobile terminal in response to the sixth instruction, where the first switching request is used to request the second mobile terminal to switch the Wi-Fi working mode to SISO.

In a possible implementation, the specified value includes a maximum access quantity supported by the Wi-Fi chip. In this way, due to a limitation of the Wi-Fi chip or the like, there is a maximum quantity of (for example, a maximum of eight) STAs accessed by the first mobile terminal serving as a Wi-Fi hotspot AP. When the specified quantity is set to the maximum quantity of STAs accessed by the first mobile terminal, the first mobile terminal cannot actually access more STAs. Therefore, a response to the probe request is limited, and an association success rate of the Wi-Fi hotspot is not affected.

According to a third aspect, this application provides a device control method, including: After enabling a wireless hotspot function, a first mobile terminal establishes a wireless fidelity (Wi-Fi) connection to a second mobile terminal, and transmits data to the second mobile terminal in a multiple-input multiple-output (MIMO) Wi-Fi antenna working mode. The second mobile terminal accesses the internet by using the first mobile terminal connected through Wi-Fi.

The first mobile terminal monitors a remaining battery level and/or a device temperature of the first mobile terminal. When the remaining battery level is less than a first battery level threshold and/or the device temperature is greater than a first temperature threshold, the first mobile terminal switches the Wi-Fi antenna working mode to single-input single-output (SISO), and/or limits a maximum forwarding rate of a transmission control protocol (TCP) packet or a user datagram protocol (UDP) packet to a first rate, and/or no longer responds to a probe request.

According to the device control method provided in this application, after the first mobile terminal enables the Wi-Fi hotspot function, the first mobile terminal may dynamically adjust a working mode of the first mobile terminal based on a battery level status and/or the device temperature. When the remaining battery level is less than the first battery level threshold and/or the device temperature is greater than the first temperature threshold, the first mobile terminal switches the Wi-Fi antenna working mode to single-input single-output (SISO), and/or limits the maximum forwarding rate of the transmission control protocol (TCP) packet or the user datagram protocol (UDP) packet to less than the first rate, and/or no longer responds to the probe request. Therefore, power consumption of the first mobile terminal is reduced.

In a possible implementation, the method further includes: When a quantity of terminal devices connected to the first mobile terminal through Wi-Fi reaches a specified value, the first mobile terminal no longer responds to the probe request. In this way, due to a limitation of a Wi-Fi chip or the like, there is a maximum quantity of (for example, a maximum of eight) STAs accessed by the first mobile terminal serving as a Wi-Fi hotspot AP. When the specified quantity is set to the maximum quantity of STAs accessed by the first mobile terminal, the first mobile terminal cannot actually access more STAs. Therefore, a response to the probe request is limited, and an association success rate of the Wi-Fi hotspot is not affected.

In a possible implementation, the method further includes: When the remaining battery level is less than a second battery level threshold, the first mobile terminal limits the maximum forwarding rate of the TCP packet or the UDP packet to a second rate, where the second battery level threshold is less than the first battery level threshold, and the second rate is less than the first rate. In this way, the maximum forwarding rate of the TCP packet or the UDP packet is adjusted in a gradient manner based on the remaining battery level, so that transmission performance and power consumption of the first mobile terminal can be balanced.

In a possible implementation, the method further includes: When the device temperature is greater than a second temperature threshold, the first mobile terminal limits the maximum forwarding rate of the TCP packet or the UDP packet to a second rate. The second temperature threshold is greater than the first temperature threshold. In this way, the maximum forwarding rate of the TCP packet or the UDP packet is adjusted in a gradient manner based on the device temperature, so that transmission performance and power consumption of the first mobile terminal can be balanced.

In a possible implementation, the method further includes: When the first mobile terminal detects that a preset high power consumption application is running, the first mobile terminal switches the Wi-Fi antenna working mode to SISO, and/or limits the maximum forwarding rate of the TCP packet or the UDP packet to the first rate, and/or no longer responds to the probe request. In this way, when the high power consumption application is running, the first mobile terminal can reduce a quantity of working Wi-Fi antennas, limit the forwarding rate of the TCP packet or the UDP packet, and no longer respond to the probe request, to reduce power consumption of the first mobile terminal.

In a possible implementation, before the first mobile terminal switches the Wi-Fi antenna working mode to SISO, the first mobile terminal sends a first switching request to the second mobile terminal, where the first switching request is used to request the second mobile terminal to switch the Wi-Fi antenna working mode to SISO.

In a possible implementation, the specified value includes a maximum access quantity supported by a Wi-Fi chip of the first mobile terminal. In this way, due to a limitation of the Wi-Fi chip or the like, there is a maximum quantity of (for example, a maximum of eight) STAs accessed by the first mobile terminal serving as a Wi-Fi hotspot AP. When the specified quantity is set to the maximum quantity of STAs accessed by the first mobile terminal, the first mobile terminal cannot actually access more STAs. Therefore, a response to the probe request is limited, and an association success rate of the Wi-Fi hotspot is not affected.

According to a fourth aspect, this application provides a mobile terminal, including one or more processors and one or more memories. The one or more memories are coupled to the one or more processors. The one or more memories are configured to store computer program code. The computer program code includes computer instructions. When the one or more processors execute the computer instructions, a mobile terminal is enabled to perform the device control method according to any possible implementation of any aspect.

According to a fifth aspect, an embodiment of this application provides a computer storage medium, including computer instructions. When the computer instructions are run on a mobile terminal, the mobile terminal is enabled to perform the device control method according to any possible implementation of any aspect.

According to a sixth aspect, an embodiment of this application provides a computer program product. When the computer program product runs on a computer, the computer is enabled to perform the device control method according to any possible implementation of any aspect.

DESCRIPTION OF EMBODIMENTS

The following clearly describes technical solutions in embodiments of this application in detail with reference to accompanying drawings. In descriptions of the embodiments of this application, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

Figure 1:
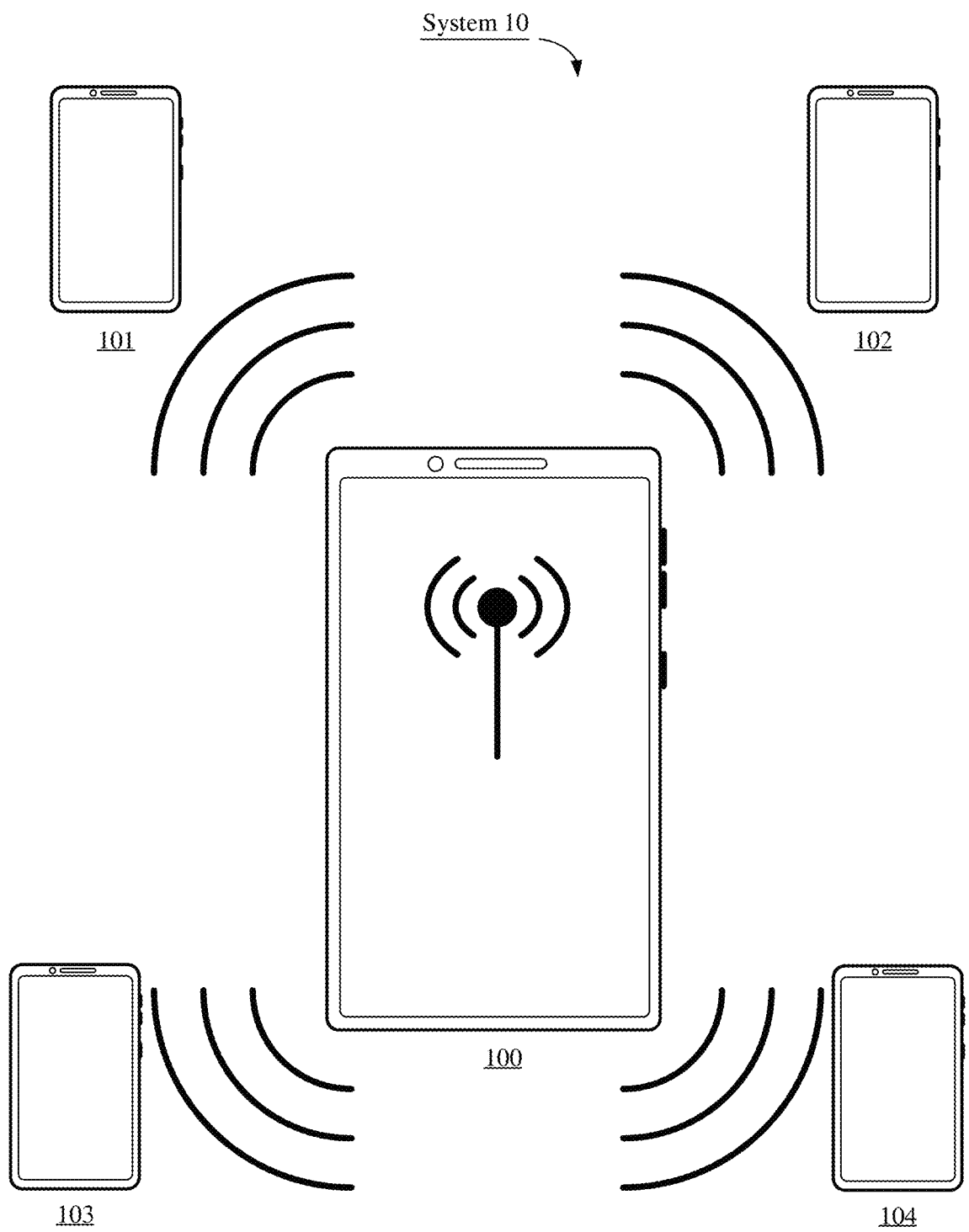
FIG. 1 is a schematic diagram of a system according to an embodiment of this application.

FIG. 1 is a schematic diagram of an architecture of a system according to this application.

As shown in FIG. 1, the system 10 includes a mobile terminal 100 and a plurality of other devices (for example, a mobile terminal 101, a mobile terminal 102, a mobile terminal 103, and a mobile terminal 104). The mobile terminal 100 has a Wi-Fi hotspot function, that is, the mobile terminal 100 may serve as a Wi-Fi access point (AP), convert a signal received through GPRS, 3G, 4G, or 5G into a Wi-Fi signal, and send the Wi-Fi signal to another device (for example, the mobile terminal 101, the mobile terminal 102, the mobile terminal 103, or the mobile terminal 104). The another device (for example, the mobile terminal 101, the mobile terminal 102, the mobile terminal 103, or the mobile terminal 104) may serve as a station (STA) in a Wi-Fi network, and establish a Wi-Fi connection to the mobile terminal 100.

A device (the mobile terminal 100, the mobile terminal 101, the mobile terminal 102, the mobile terminal 103, the mobile terminal 104, or the like) in the system 10 may be a mobile phone, a tablet computer, a personal digital assistant (PDA), an in-vehicle computer, or the like.

In this application, the mobile terminal 100 that serves as the Wi-Fi AP after the Wi-Fi hotspot function is enabled may be referred to as a first mobile terminal, and another Wi-Fi STA that establishes a Wi-Fi connection to the mobile terminal 100 may be referred to as a second mobile terminal (for example, the mobile terminal 101, the mobile terminal 102, the mobile terminal 103, and the mobile terminal 104 in FIG. 1). In the following embodiments of this application, the mobile terminal 100 is the first mobile terminal, and the STA is the second mobile terminal.

Figure 2:
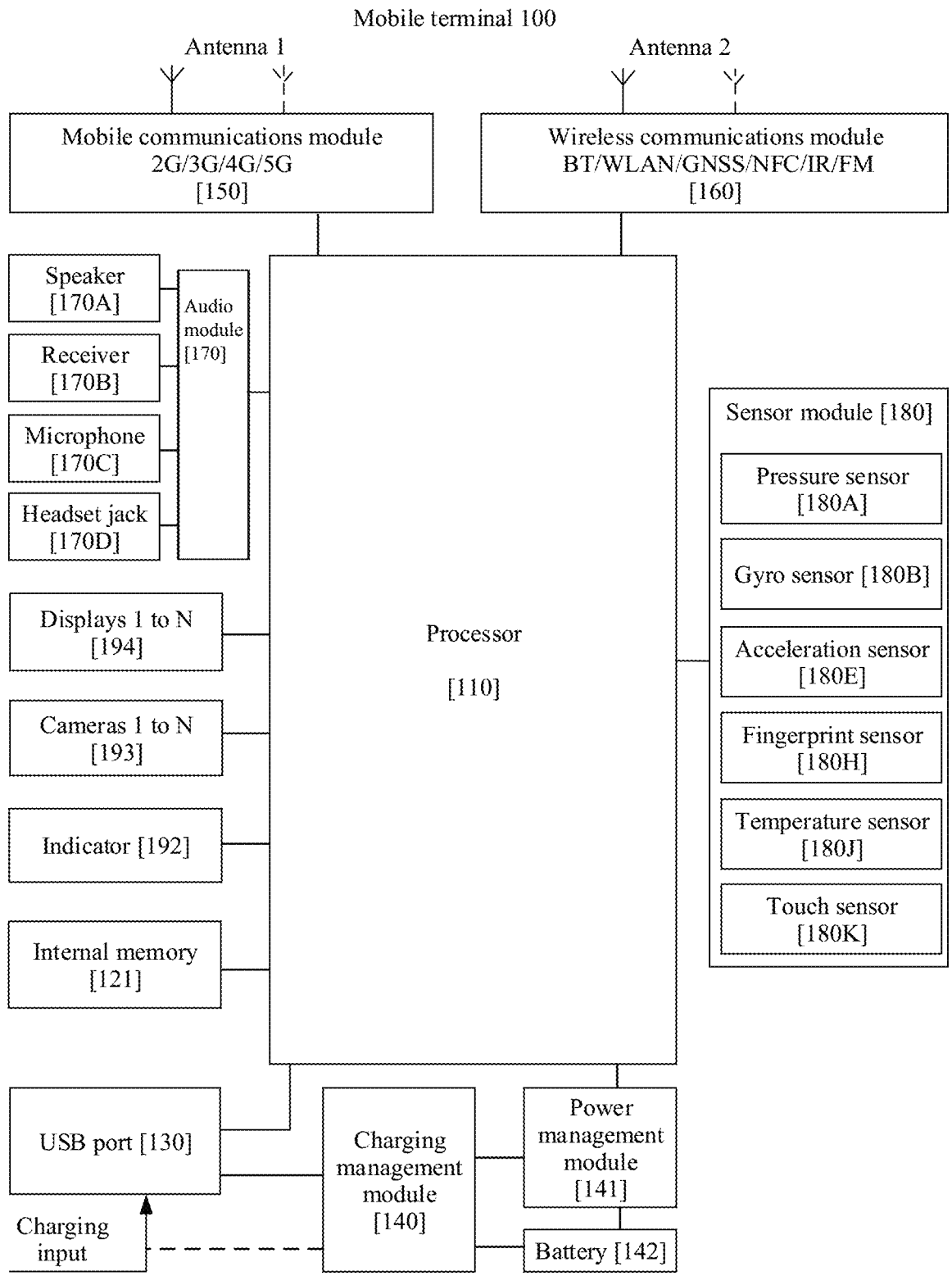
FIG. 2 is a schematic diagram of a structure of a mobile terminal according to an embodiment of this application.

FIG. 2 is a schematic diagram of a structure of a mobile terminal 100.

The mobile terminal 100 is used as an example below to describe the embodiments in detail. It should be understood that the mobile terminal 100 shown in FIG. 2 is merely an example, and the mobile terminal 100 may have more or fewer components than those shown in FIG. 2, may combine two or more components, or may have different component configurations. The components shown in FIG. 2 may be implemented in hardware including one or more signal processing and/or application-specific integrated circuits, software, or a combination of hardware and software.

The mobile terminal 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the mobile terminal 100. In some other embodiments of this application, the mobile terminal 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), and/or the like. Different processing units may be independent components, or may be integrated into one or more processors.

The controller may be a nerve center and a command center of the mobile terminal 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory.

The memory may store instructions or data just used or cyclically used by the processor 110. If the processor 110 needs to use the instructions or the data again, the processor 110 may directly invoke the instructions or the data from the memory. This avoids repeated access, and reduces waiting time of the processor 110, so that system efficiency is improved.

The USB port 130 is a port that conforms to a USB standard specification, and may be specifically a mini USB port, a micro USB port, a USB Type-C port, or the like. The USB port 130 may be configured to connect to a charger to charge the mobile terminal 100, may be configured to perform data transmission between the mobile terminal 100 and a peripheral device, or may be configured to connect to a headset to play audio by using the headset. The port may alternatively be configured to connect to another mobile terminal such as an AR device.

It may be understood that the interface connection relationship between modules shown in this embodiment of the present invention is merely an example for description, and does not constitute a structural limitation on the mobile terminal 100. In some other embodiments of this application, the mobile terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the mobile terminal 100. When charging the battery 142, the charging management module 140 may further supply power to the mobile terminal by using the power management module 141.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the mobile terminal 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another functional module.

The wireless communications module 160 may provide a solution, applied to the mobile terminal 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the mobile terminal 100, the antenna 1 is coupled to the mobile communications module 150, and the antenna 2 is coupled to the wireless communications module 160, so that the mobile terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The mobile terminal 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the mobile terminal 100 may include one or N displays 194, where N is a positive integer greater than 1.

The mobile terminal 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile terminal 100 may include one or N cameras 193, where N is a positive integer greater than 1.

The digital signal processor is configured to process a digital signal, and may process another digital signal in addition to the digital image signal. For example, when the mobile terminal 100 selects a frequency, the digital signal processor is configured to perform Fourier transform and the like on frequency energy.

The video codec is configured to: compress or decompress a digital video. The mobile terminal 100 may support one or more video codecs. In this way, the mobile terminal 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. The mobile terminal 100 may implement applications such as intelligent cognition through the NPU, for example, image recognition, facial recognition, speech recognition, and text understanding.

The internal memory 121 may be configured to store computer-executable program code. The executable program code includes instructions. The processor 110 runs the instructions stored in the internal memory 121, to implement various function applications and data processing of the mobile terminal 100. The internal memory 121 may include a program storage area and a data storage area. The program storage area may store an operating system, an application required by at least one function (for example, a voice playing function or an image playing function), and the like. The data storage area may store data (for example, audio data or an address book) created in a process of using the mobile terminal 100, and the like. In addition, the internal memory 121 may include a high-speed random access memory, or may include a nonvolatile memory such as at least one magnetic disk storage device, a flash memory, or a universal flash storage (UFS).

The mobile terminal 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile terminal 100 may listen to music or answer a hands-free call through the speaker 170A.

The receiver 170B, also referred to as an "earpiece", is configured to convert an electrical audio signal into a sound signal. When the mobile terminal 100 answers a call or listens to a voice message, the receiver 170B may be placed near a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the mobile terminal 100. In some other embodiments, two microphones 170C may be disposed in the mobile terminal 100, to collect a sound signal and further implement a noise reduction function. In some other embodiments, three, four, or more microphones 170C may be disposed in the mobile terminal 100, to collect a sound signal, reduce noise, identify a sound source, implement a directional recording function, and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile terminal 100 determines pressure strength based on a change of the capacitance. When a touch operation is performed on the display 194, the mobile terminal 100 detects intensity of the touch operation based on the pressure sensor 180A. The mobile terminal 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the mobile terminal 100. In some embodiments, an angular velocity of the mobile terminal 100 around three axes (namely, axes x, y, and z) may be determined through the gyro sensor 180B. The gyro sensor 180B may be configured to perform image stabilization during photographing. For example, when the shutter is pressed, the gyro sensor 180B detects an angle at which the mobile terminal 100 shakes, and calculates, based on the angle, a distance for which a lens module needs to compensate, so that the lens cancels the shake of the mobile terminal 100 through reverse motion, thereby implementing the image stabilization. The gyro sensor 180B may be further used in a navigation scenario and a motion-sensing game scenario.

The acceleration sensor 180E may detect values of accelerations in various directions (usually on three axes) of the mobile terminal 100. When the mobile terminal 100 is still, a value and a direction of gravity can be detected. The acceleration sensor 180E may be further configured to identify a posture of the mobile terminal, and is applied to an application such as screen switching between a landscape mode and a portrait mode and a pedometer.

The fingerprint sensor 180H is configured to collect a fingerprint. The mobile terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile terminal 100 executes a temperature processing policy based on the temperature detected by the temperature sensor 180J. For example, when the temperature reported by the temperature sensor 180J exceeds a threshold, the mobile terminal 100 degrades performance of a processor near the temperature sensor 180J, to reduce power consumption and implement thermal protection. In some other embodiments, when the temperature is less than another threshold, the mobile terminal 100 heats up the battery 142, to avoid abnormal shutdown of the mobile terminal 100 because of a low temperature. In some other embodiments, when the temperature is less than still another threshold, the mobile terminal 100 boosts an output voltage of the battery 142, to avoid abnormal shutdown because of a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the mobile terminal 100 at a location different from that of the display 194.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile terminal 100. The mobile terminal 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The mobile terminal 100 interacts with a network by using the SIM card, to implement functions such as calling and data communication. In some embodiments, the mobile terminal 100 uses an eSIM, namely, an embedded SIM card. The eSIM card may be embedded in the mobile terminal 100, and cannot be separated from the mobile terminal 100.

Currently, after a Wi-Fi hotspot function of the mobile terminal 100 is enabled, the mobile terminal 100 may serve as an AP in a Wi-Fi network. A STA first needs to discover a surrounding wireless service through active or passive scanning, and then can establish a connection to the AP only after two processes of authentication and association are performed.

The STA may obtain network information of a surrounding wireless network through active scanning or passive scanning. The network information includes a network name (for example, a service set identifier (SSID)), a MAC address of the AP, wireless network signal strength, an encryption and authentication manner, and the like.

Active scanning may be as follows: The STA first sends a broadcast or directed probe request to the AP. After receiving the broadcast or directed probe request sent by the STA, the AP may send a probe response to the STA. The probe response includes the foregoing network information.

Passive scanning may be as follows: The AP periodically broadcasts a beacon frame, and the STA may periodically listen to the beacon frame in a channel list that supports broadcasting, to obtain the foregoing network information.

Usually, the AP may support both active scanning and passive scanning performed by the STA. Therefore, after enabling a Wi-Fi hotspot, the mobile terminal needs to respond at any time to a probe request sent by each STA over an air interface, and needs to periodically send a management frame such as a beacon. As a result, power consumption is high.

Figure 3A:
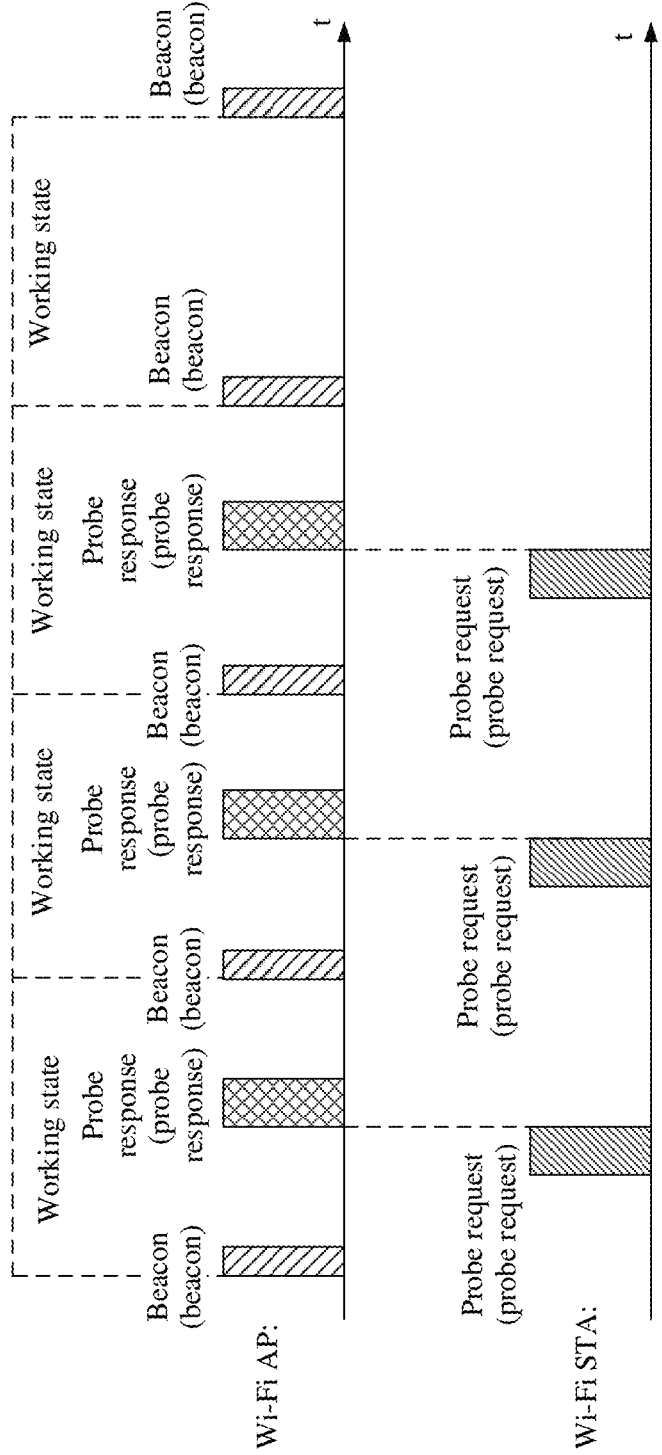
FIG. 3A is a schematic principle diagram of a probe request and a probe response according to a related technology of this application.

As shown in FIG. 3A, after enabling a Wi-Fi hotspot function, the mobile terminal 100 may serve as an AP in a Wi-Fi network, and periodically (for example, a period is 100 ms) broadcast a management frame such as a beacon, to notify a surrounding STA that a wireless network established by the AP and the foregoing wireless network information currently exist. When obtaining the beacon frame through listening, the STA may obtain network information of a wireless network in which the mobile terminal 100 serves as the AP. In addition, the STA may also actively send a probe request to scan for a wireless network currently existing in an area in which the STA is located. After receiving the probe request sent by the STA, the AP may return a probe response to the STA. The STA may obtain the network information of the wireless network by using the received probe response. In this way, after enabling the Wi-Fi hotspot function, the mobile terminal 100 needs to respond at any time to the probe request sent by the STA. As a result, power consumption is high due to a no sleep state.

Figure 3B:
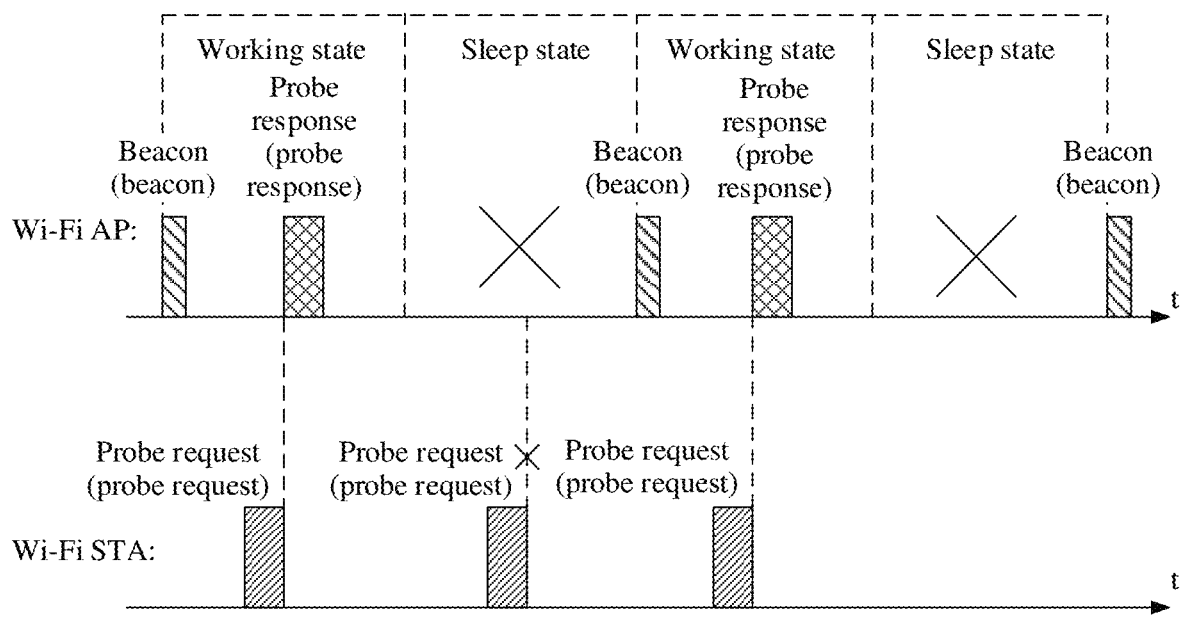
FIG. 3B is a schematic principle diagram of a probe request and a probe response according to another related technology of this application.

In a related technology, after the Wi-Fi hotspot function is enabled, the mobile terminal 100 may alternately switch between a working state and a sleep state by using a hotspot periodic sleep mechanism. As shown in FIG. 3B, after enabling a Wi-Fi hotspot function, the mobile terminal 100 may send a management frame such as a beacon in a working state, or may return a probe response to a STA after receiving a probe request sent by the STA. In a sleep state, the mobile terminal 100 may close a radio frequency transceiver channel, to reduce power consumption.

However, because a periodic sleep state is added, and the mobile terminal in the sleep state cannot respond to the probe request sent by the STA, a Wi-Fi hotspot of the mobile terminal cannot be discovered. As a result, an association success rate of the Wi-Fi hotspot is affected, and user experience is poor.

Based on the foregoing problems, this application provides a device control method. After enabling a Wi-Fi hotspot function, the mobile terminal 100 may respond, in a normal working state at any time, to a probe request sent by each STA over an air interface. Therefore, an association success rate of the Wi-Fi hotspot is not affected. In addition, the mobile terminal 100 may dynamically adjust a working mode of the mobile terminal 100 based on conditions such as a battery level status and/or a device temperature of the mobile terminal 100 (including switching a Wi-Fi antenna working mode to single-input single-output (SISO), and/or limiting a maximum forwarding rate of a transmission control protocol (TCP) packet or a user datagram protocol (UDP) packet to less than a first rate, and/or no longer responding to a probe request). Therefore, power consumption of the mobile terminal 100 is reduced.

The following specifically describes a device control method provided in an embodiment of this application.

In some application scenarios, after enabling a Wi-Fi hotspot function, the mobile terminal 100 may monitor (for example, periodically detect) a remaining battery level and/or a device temperature of the mobile terminal 100. When the remaining battery level of the mobile terminal 100 is less than a first battery level threshold (for example, 20% of a total battery level, or the terminal device enters a power saving mode) and/or the device temperature of the mobile terminal 100 is greater than a first temperature threshold, the mobile terminal 100 may limit a response to a probe request sent by a Wi-Fi STA. Because the response to the probe request sent by the Wi-Fi STA is limited, the mobile terminal 100 may not send a probe response frame, to reduce power consumption of the mobile terminal 100.

Figure 4:
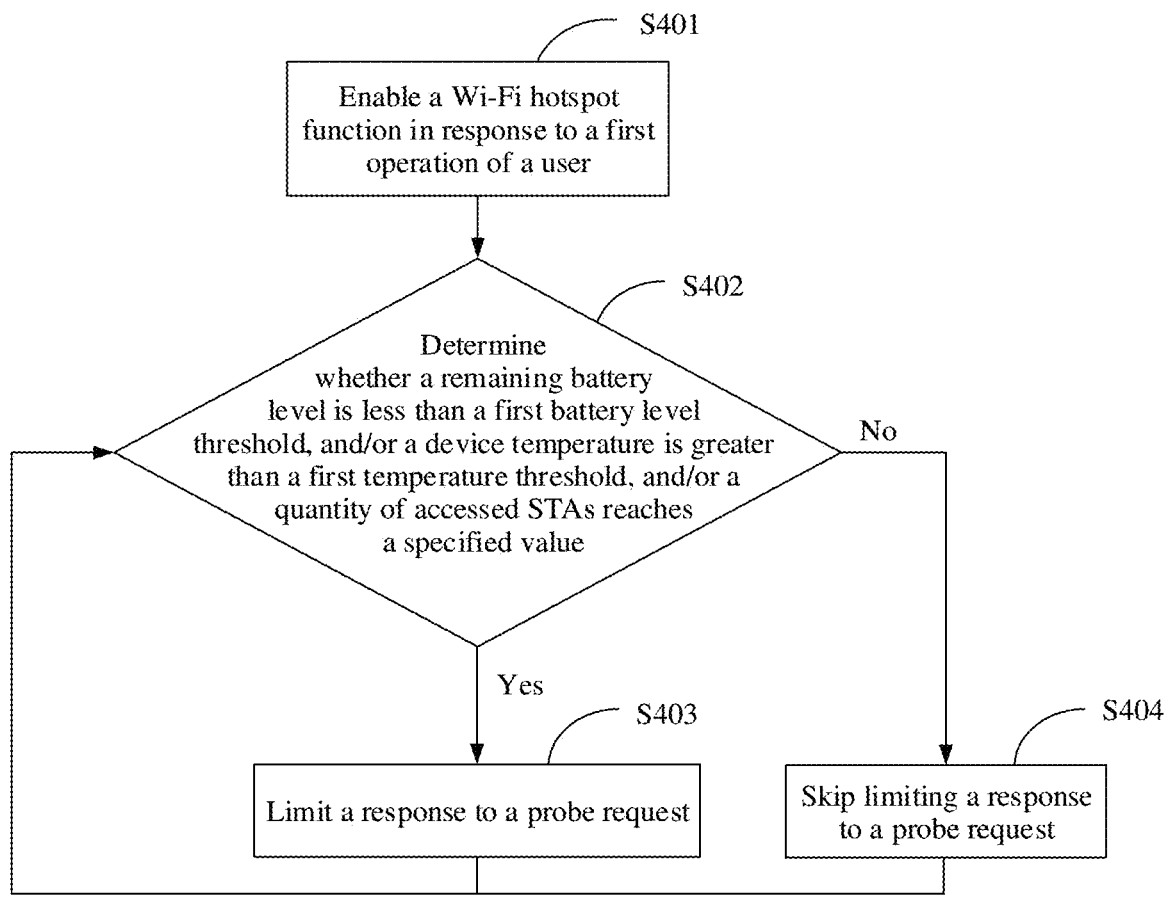
FIG. 4 is a schematic flowchart of a device control method according to an embodiment of this application.

FIG. 4 is a device control method according to an embodiment of this application. As shown in FIG. 4, the method includes the following steps.

S401: A mobile terminal 100 enables a Wi-Fi hotspot function in response to a first operation of a user.

Figure 5A:
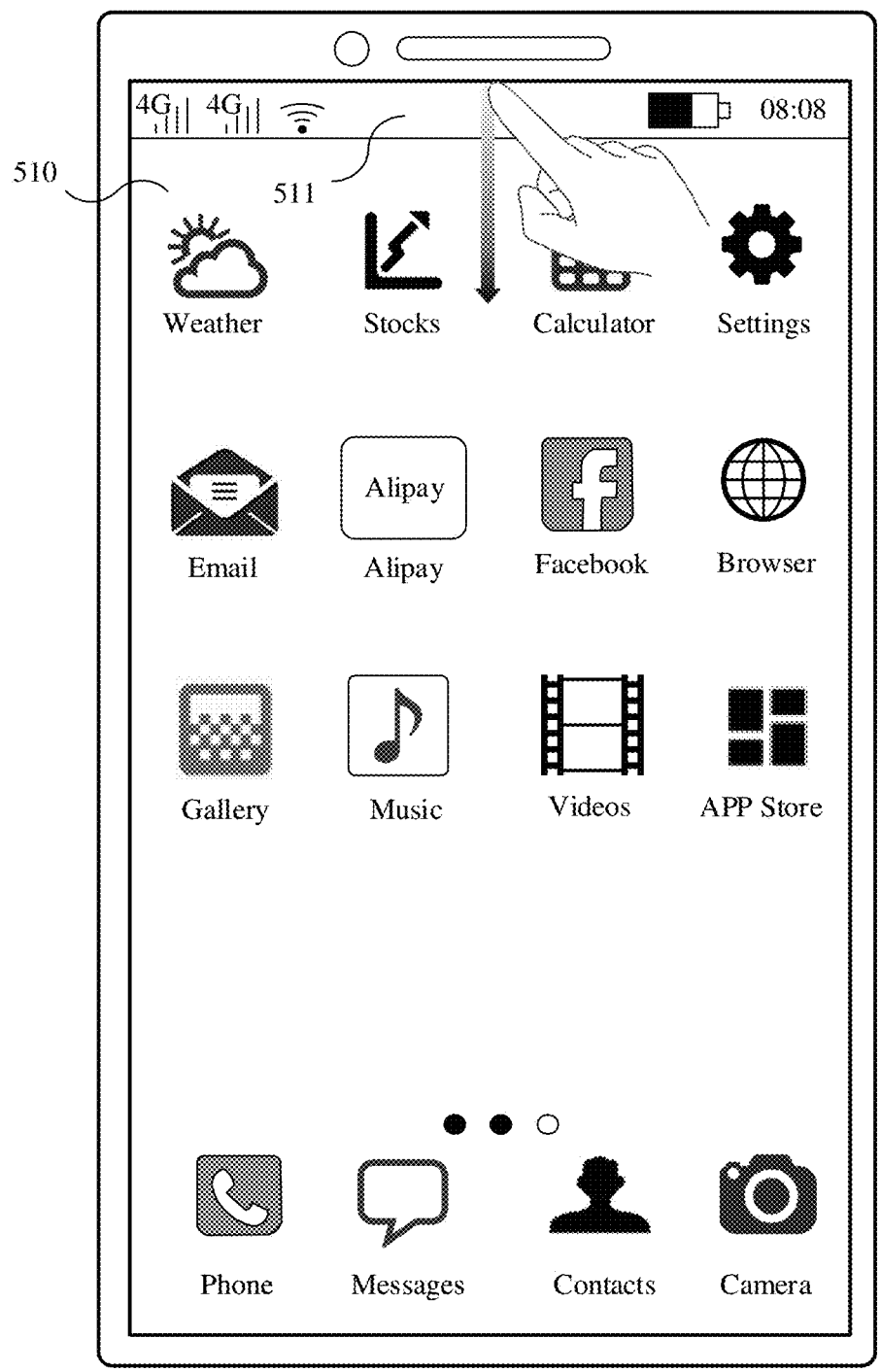
FIG. 5A to FIG. 5C are a schematic diagram of a group of interfaces according to an embodiment of this application.

For example, as shown in FIG. 5A, the mobile terminal 100 may display a home screen interface 510. The home screen interface 510 may display one or more application icons (for example, a Weather application icon, a Stocks application icon, a Calculator application icon, a Settings application icon, an Email application icon, an Alipay application icon, a Facebook application icon, a Browser application icon, a Gallery application icon, a Music application icon, a Videos application icon, an App Store application icon, a Phone application icon, a Messages application icon, a Contacts application icon, and a Camera application icon). The mobile terminal 100 may display a status bar 511 above the home screen interface 510. The status bar 511 may include an operator signal indication, a Wi-Fi signal indication, a remaining battery level indicator, time, and the like.

The mobile terminal 100 may receive an input operation performed by the user on the status bar 511 (for example, an operation of sliding downward from a location of the status bar 511). In response to the input operation performed on the status bar 511, the mobile terminal 100 may display a pull-down window 520 shown in FIG. 5B.

Figure 5B:
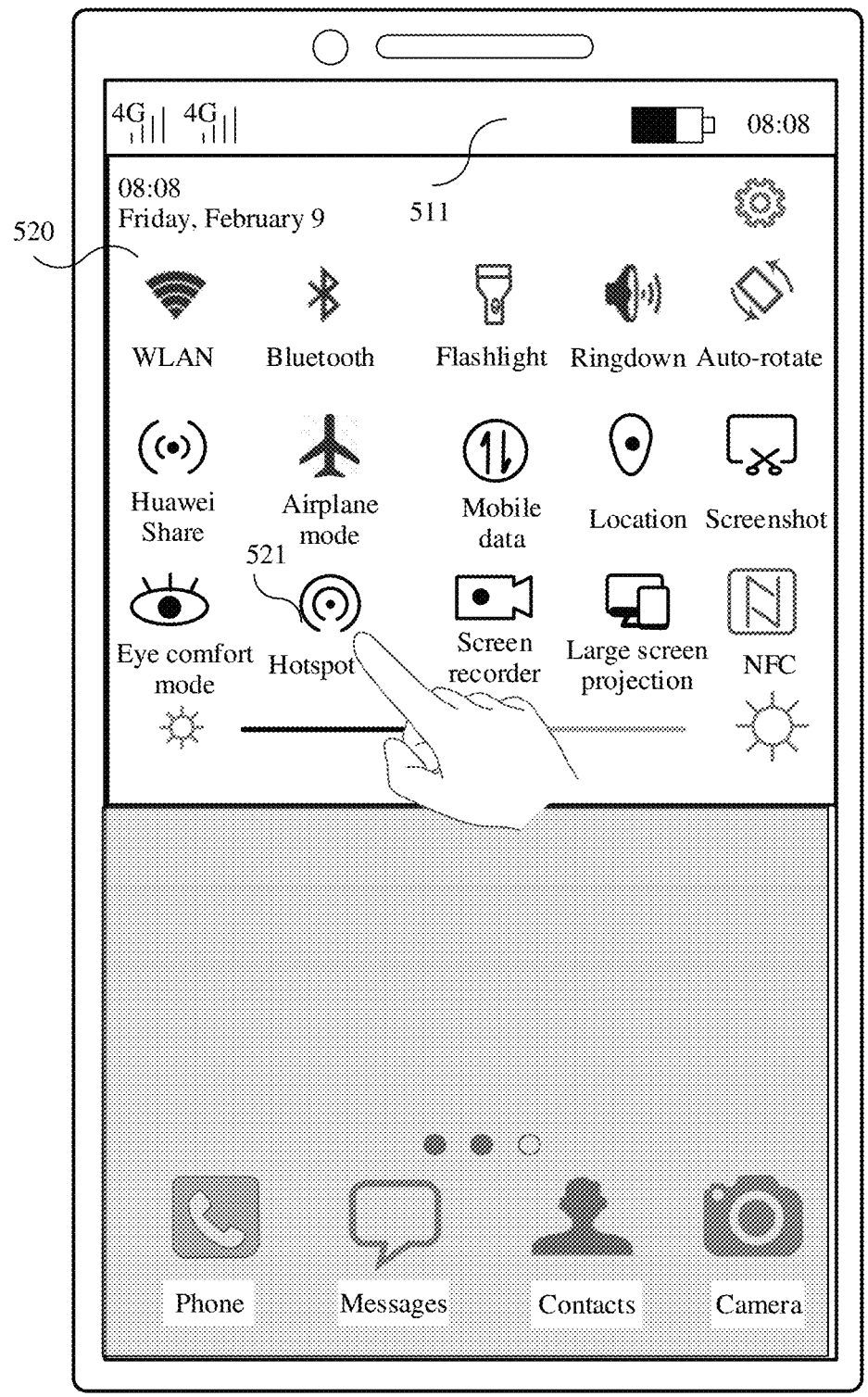

As shown in FIG. 5B, the window 520 may display some function on/off controls (for example, a WLAN on/off control, a Bluetooth on/off control, a flashlight on/off control, a reminder type switching control, an auto-rotate on/off control, a Huawei Share on/off control, an airplane mode on/off control, a mobile data on/off control, a location on/off control, a screenshot on/off control, an eye comfort mode on/off control, a hotspot on/off control 521, a screen recorder on/off control, a large-screen projection on/off control, and an NFC on/off control).

Figure 5C:
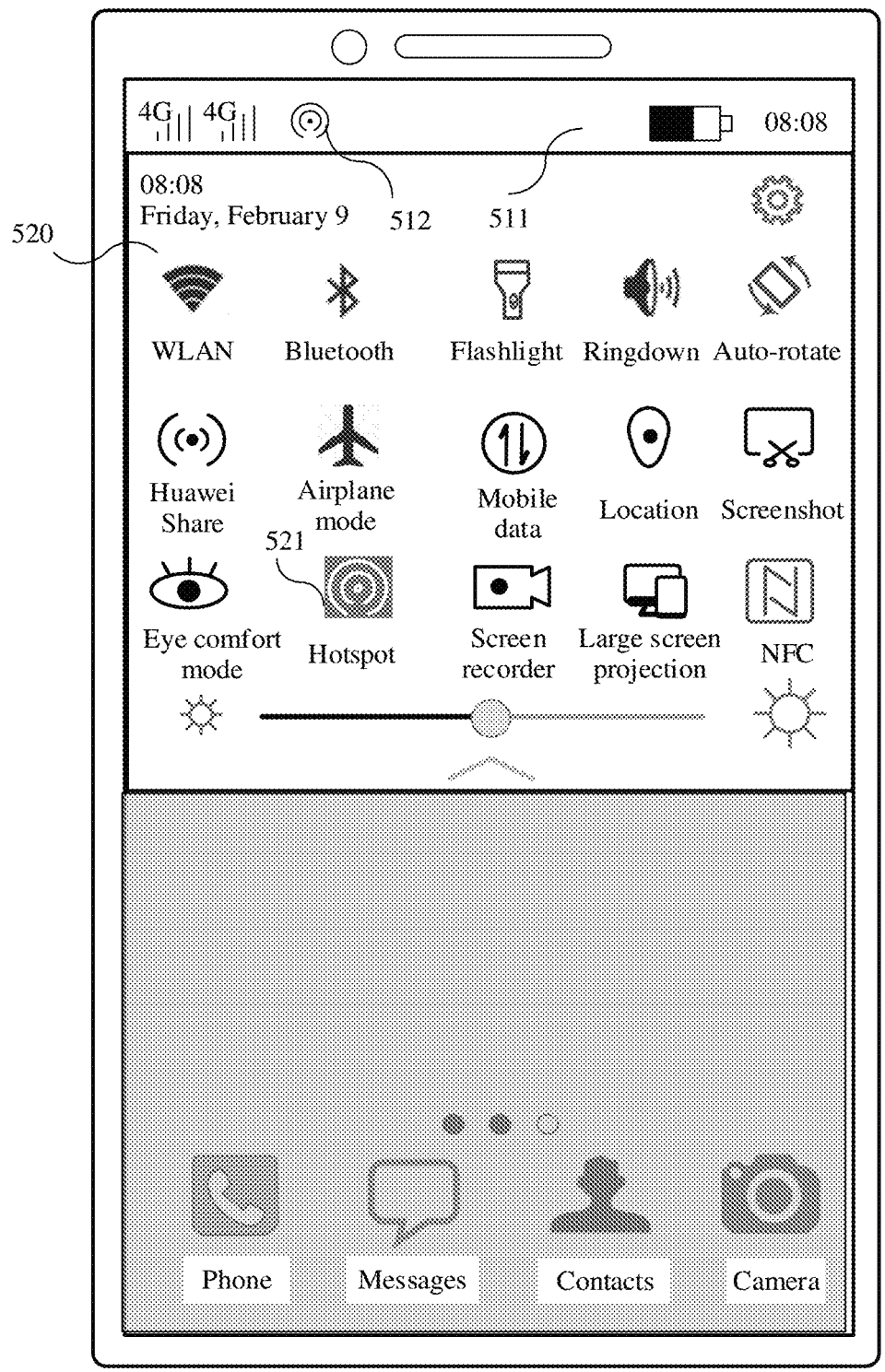

The mobile terminal 100 may receive an input operation (for example, a tap operation) performed by the user on the hotspot on/off control 521. In response to the input operation performed on the hotspot on/off control 521, the mobile terminal 100 may enable a Wi-Fi hotspot function. After enabling the Wi-Fi hotspot function, the mobile terminal 100 may display, on the status bar 511, a hotspot enabling prompt 512 shown in FIG. 5C, to prompt the user that the Wi-Fi hotspot function is currently enabled.

In this embodiment of this application, the first operation may be the input operation performed on the hotspot on/off control 521 in FIG. 5B. Alternatively, the first operation may be another operation. For example, the mobile terminal 100 may enable the hotspot function of the mobile terminal 100 by receiving a hotspot function enabling instruction entered by the user through a voice. For another example, the user may alternatively enable the Wi-Fi hotspot function of the mobile terminal in a mobile network sharing interface in a Settings application. This is not limited in embodiments of the present disclosure.

After enabling the Wi-Fi hotspot function, the mobile terminal 100 may periodically broadcast a management frame such as a beacon, to notify a surrounding device that a Wi-Fi network in which the mobile terminal 100 is an access point currently exists, and may also respond to a probe request sent by the surrounding device. After enabling the Wi-Fi hotspot function, the mobile terminal 100 may further periodically detect a remaining battery level and/or a device temperature of the mobile terminal 100.

Usually, when the mobile terminal 100 enables the Wi-Fi hotspot function, the mobile terminal 100 may automatically enable a wireless local area network (WLAN) function.

The mobile terminal 100 may monitor the remaining battery level of a battery by using the power management module 141 in FIG. 2, and may detect the device temperature of the mobile terminal 100 by using the temperature sensor 180J in FIG. 2. The device temperature may be a temperature around a component of the mobile terminal 100. For example, the device temperature may be a temperature of the battery in the mobile terminal 100, may be a temperature of a Wi-Fi chip in the mobile terminal 100, or may be a temperature of an application processor in the mobile terminal 100. When there are a plurality of temperature sensors 180J in the mobile terminal 100, the device temperature may alternatively be an average temperature of the mobile terminal 100. The mobile terminal 100 may further calculate the average temperature of the mobile terminal 100 by using temperature values reported by the plurality of temperature sensors 180J.

S402: The mobile terminal 100 determines whether the remaining battery level is less than a first battery level threshold, and/or the device temperature is greater than a first temperature threshold, and/or a quantity of accessed STAs reaches a specified value. If the remaining battery level is less than the first battery level threshold, and/or the device temperature is greater than the first temperature threshold, and/or the quantity of accessed STAs reaches the specified value, the mobile terminal 100 may perform step S403 in which the mobile terminal 100 may limit a response to a probe request. If the remaining battery level is not less than the first battery level threshold, and/or the device temperature is not greater than the first temperature threshold, and/or the quantity of accessed STAs does not reach the specified value, the mobile terminal 100 may perform step S404 in which the mobile terminal 100 does not limit a response to a probe request.

There are the following cases in which the mobile terminal 100 determines whether the remaining battery level is less than the specified battery level threshold, and/or the device temperature is greater than the specified temperature threshold, and/or the quantity of accessed STAs reaches the specified value:

1. The mobile terminal 100 may periodically (for example, a period is 1 second) detect the remaining battery level, and determine whether the remaining battery level is less than the first battery level threshold (for example, 50% of a total battery level). If the remaining battery level is less than the first battery level threshold, the mobile terminal 100 may limit the response to the probe request. If the remaining battery level is not less than the first battery level threshold, the mobile terminal 100 may not limit the response to the probe request. A period in which the mobile terminal 100 detects the remaining battery level and a period in which the mobile terminal 100 determines whether the remaining battery level is less than the specified battery level threshold may be the same or may be different. This is not limited in embodiments of the present disclosure.

In some embodiments, the mobile terminal 100 determines whether a high power consumption service is currently running (for example, a game application is running, a video is being played, a voice call is ongoing, or a video call is ongoing). If the high power consumption service is currently running, the mobile terminal 100 may limit the response to the probe request. In this way, when the high power consumption application is running, the response to the probe request can be limited, to reduce power consumption of the mobile terminal.

2. The mobile terminal 100 may periodically (for example, a period is 1 second) detect the device temperature, and determine whether the device temperature is greater than the first temperature threshold (for example, 60 degrees Celsius). If the device temperature is greater than the first temperature threshold, the mobile terminal 100 may limit the response to the probe request. If the device temperature is not greater than the first temperature threshold, the mobile terminal 100 may not limit the response to the probe request. A period in which the mobile terminal 100 detects the device temperature and a period in which the mobile terminal 100 determines whether the device temperature is greater than the specified temperature threshold may be the same or may be different. This is not limited in embodiments of the present disclosure.

3. The mobile terminal 100 may detect whether the quantity of accessed STAs reaches the specific value. If the quantity of accessed STAs reaches the specified value, the mobile terminal limits the response to the probe request. If the quantity of accessed STAs does not reach the specified value, the mobile terminal 100 may not limit the response to the probe request.

4. The mobile terminal 100 may periodically (for example, a period is 1 second) detect the remaining battery level and the device temperature, and determine whether the remaining battery level is less than the first battery level threshold (for example, 50% of a total battery level) and the device temperature is greater than the first temperature threshold (for example, 60 degrees Celsius). If the remaining battery level is less than the first battery level threshold and the device temperature is greater than the first temperature threshold, the mobile terminal 100 may limit the response to the probe request. If the remaining battery level is not less than the first battery level threshold or the device temperature is not greater than the first temperature threshold, the mobile terminal 100 may not limit the response to the probe request. A period in which the mobile terminal 100 detects the remaining battery level and the device temperature and a period in which the mobile terminal 100 determines whether the remaining battery level is less than the first battery level threshold and the device temperature is greater than the first temperature threshold may be the same or may be different. This is not limited in embodiments of the present disclosure.

5. The mobile terminal 100 may periodically (for example, a period is 1 second) detect the remaining battery level and the quantity of accessed STAs, and determine whether the remaining battery level is less than the first battery level threshold (for example, 50% of a total battery level) and the quantity of accessed STAs reaches the specific value (for example, eight). If the remaining battery level is less than the first battery level threshold and the quantity of accessed STAs reaches the specified value, the mobile terminal 100 may limit the response to the probe request. If the remaining battery level is not less than the first battery level threshold or the quantity of accessed STAs does not reach the specified value, the mobile terminal 100 may not limit the response to the probe request. A period in which the mobile terminal 100 detects the remaining battery level and the quantity of accessed STAs and a period in which the mobile terminal 100 determines whether the remaining battery level is less than the specified battery level threshold and the quantity of accessed STAs reaches the specified value may be the same or may be different. This is not limited in embodiments of the present disclosure.

6. The mobile terminal 100 may periodically (for example, a period is 1 second) detect the device temperature and the quantity of accessed STAs, and determine whether the device temperature is greater than the first temperature threshold (for example, 60 degrees Celsius) and the quantity of accessed STAs reaches the specific value (for example, eight). If the device temperature is greater than the first temperature threshold and the quantity of accessed STAs reaches the specified value, the mobile terminal 100 may limit the response to the probe request. If the device temperature is not greater than the first temperature threshold or the quantity of accessed STAs does not reach the specified value, the mobile terminal 100 may not limit the response to the probe request. A period in which the mobile terminal 100 detects the device temperature and the quantity of accessed STAs and a period in which the mobile terminal 100 determines whether the device temperature is greater than the specified temperature threshold and the quantity of accessed STAs reaches the specified value may be the same or may be different. This is not limited in embodiments of the present disclosure.

7. The mobile terminal 100 may periodically (for example, a period is 1 second) detect the remaining battery level, the device temperature and the quantity of accessed STAs, and determine whether the remaining battery level is less than the first battery level threshold (for example, 50% of a total battery level), the device temperature is greater than the first temperature threshold (for example, 60 degrees Celsius), and the quantity of accessed STAs reaches the specific value (for example, eight). If the remaining battery level is less than the first battery level threshold, the device temperature is greater than the first temperature threshold, and the quantity of accessed STAs reaches the specified value (for example, eight), the mobile terminal 100 may limit the response to the probe request. If the remaining battery level is not less than the first battery level threshold, the device temperature is not greater than the first temperature threshold, or the quantity of accessed STAs does not reach the specified value, the mobile terminal 100 may not limit the response to the probe request. A period in which the mobile terminal 100 detects the remaining battery level, the device temperature, and the quantity of accessed STAs and a period in which the mobile terminal 100 determines whether the remaining battery level is less than the first battery level threshold, the device temperature is greater than the first temperature threshold, and the quantity of accessed STAs reaches the specified value may be the same or may be different. This is not limited in embodiments of the present disclosure.

The following describes how the mobile terminal 100 limits the response to the probe request in some embodiments of this application.

Figure 6:
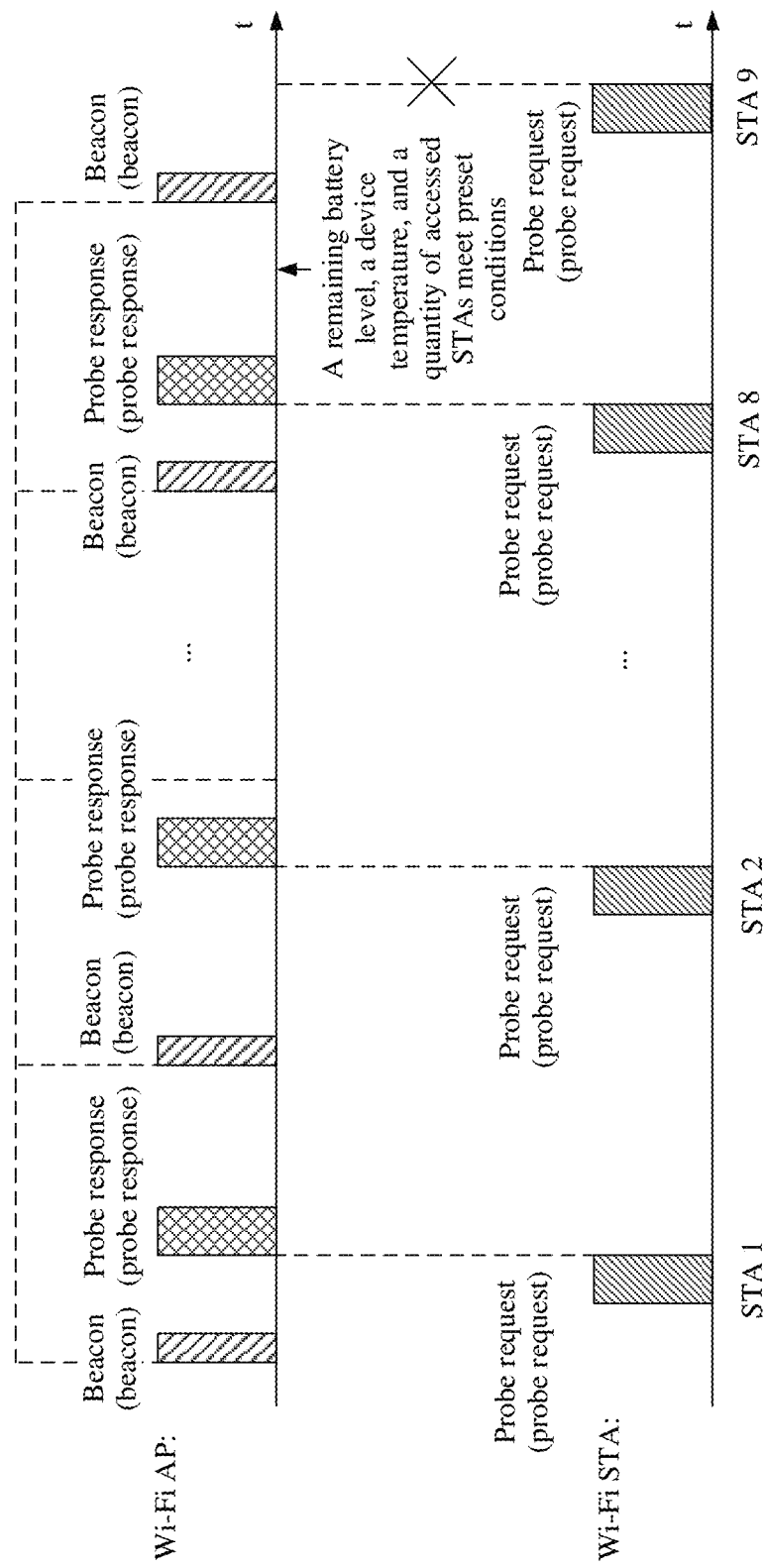
FIG. 6 is a schematic principle diagram of a probe request and a probe response according to an embodiment of this application.

As shown in FIG. 6, when the remaining battery level of the mobile terminal 100, the device temperature of the mobile terminal 100, and the quantity of STAs accessed by the mobile terminal 100 meet preset conditions, that is, the remaining battery level is less than the first battery level threshold, and/or the device temperature is greater than the first temperature threshold, and/or the quantity of accessed STAs reaches the specified value (for example, eight), if the mobile terminal 100 further receives a probe request from a new STA, the mobile terminal 100 no longer responds to the probe request sent by the new STA. To be specific, the mobile terminal 100 no longer sends a probe response to the new STA. The mobile terminal 100 can reduce, by limiting the response to the probe request, power consumption caused by responding to the probe request. In addition, due to a limitation of a Wi-Fi chip or the like, the quantity of accessed STAs that is supported by the Wi-Fi chip of the mobile terminal 100 is limited to a value. There is a maximum quantity (that is, a maximum access quantity supported by the Wi-Fi chip, for example, the maximum access quantity is eight) of STAs accessed by the mobile terminal 100 serving as a Wi-Fi hotspot AP. When the specified value is set to the maximum quantity of accessed STAs that is supported by the Wi-Fi chip of the mobile terminal 100, the mobile terminal 100 cannot actually access more STAs. Therefore, the response to the probe request is limited, and an association success rate of the Wi-Fi hotspot is not affected.

In a possible implementation, after the mobile terminal 100 enables the Wi-Fi hotspot, and a condition for enabling limiting the response to the probe request is met, if the mobile terminal 100 accesses an external power supply for charging, the mobile terminal 100 may not limit the response to the probe request.

In a possible implementation, after the mobile terminal 100 enables the Wi-Fi hotspot, and a condition for enabling limiting the response to the probe request is met, when a quantity of STAs accessed by the mobile terminal 100 reaches a specific value (for example, eight), if the mobile terminal 100 further receives a probe request sent by a new STA, the mobile terminal 100 may determine that the mobile terminal 100 may break a Wi-Fi connection from a specified STA in the plurality of accessed STAs, and respond to the probe request of the new STA. The specified STA may be a STA that has no data transmission in the plurality of STAs accessed by the AP. In a specific implementation, the specified STA may alternatively be a STA that has a minimum access frequency in the plurality of accessed STAs. In this way, the mobile terminal 100 may respond to the probe request sent by the new STA without increasing the quantity of accessed STAs, and provide an access condition for the new STA, to reduce power consumption.

In some application scenarios, after enabling the Wi-Fi hotspot function, the mobile terminal 100 may send data to a connected STA by using a multiple-input multiple-output (MIMO) multi-antenna technology, or may send data by using a single-input single-output (SISO) single-antenna technology. After enabling the Wi-Fi hotspot function, the mobile terminal 100 sends data to the STA in a MIMO mode by default. After the mobile terminal 100 enables the Wi-Fi hotspot function, the mobile terminal 100 may monitor (that is, periodically detect) a remaining battery level and/or a device temperature of the mobile terminal 100. When the remaining battery level of the mobile terminal 100 is less than a first battery level threshold and/or the device temperature of the mobile terminal 100 is greater than a first temperature threshold, the mobile terminal 100 may switch to an SISO mode to send data to the STA. Because a quantity of radio frequency circuits used when the mobile terminal 100 works in the SISO mode is less than a quantity of radio frequency circuits used when the mobile terminal 100 works in the MIMO mode, power consumption is lower, to reduce power consumption of the mobile terminal 100.

Figure 7:
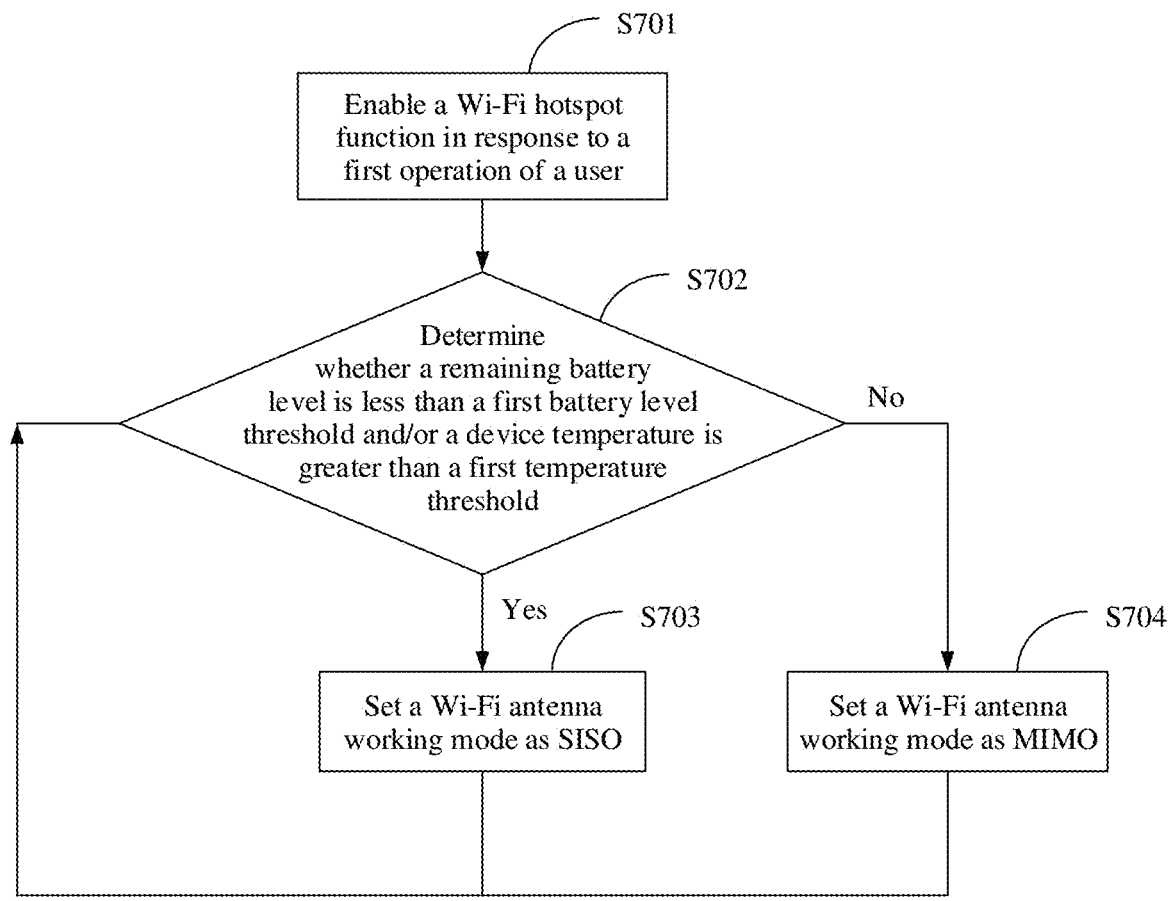
FIG. 7 is a schematic flowchart of a device control method according to another embodiment of this application.

FIG. 7 is a device control method according to an embodiment of this application. As shown in FIG. 7, the method includes the following steps.

S701: A mobile terminal 100 enables a Wi-Fi hotspot function in response to a first operation of a user.

For specific content, refer to step S401 in the embodiment shown in FIG. 4.

S702: The mobile terminal 100 may determine whether a remaining battery level of the mobile terminal 100 is less than a first battery level threshold and/or a device temperature of the mobile terminal 100 is greater than a first temperature threshold. If the remaining battery level of the mobile terminal 100 is less than the first battery level threshold and/or the device temperature of the mobile terminal 100 is greater than the first temperature threshold, the mobile terminal 100 may perform step S703 in which the mobile terminal 100 sets a Wi-Fi antenna working mode as SISO. If the remaining battery level of the mobile terminal 100 is not less than the first battery level threshold and/or the device temperature of the mobile terminal 100 is not greater than the first temperature threshold, the mobile terminal 100 may perform step S704 in which the mobile terminal 100 sets a Wi-Fi antenna working mode as MIMO.

There are the following cases in which the mobile terminal 100 determines whether the remaining battery level is less than the first battery level threshold and/or the device temperature is greater than the first temperature threshold:

1. The mobile terminal 100 may periodically (for example, a period is 1 second) detect the remaining battery level, and determine whether the remaining battery level is less than the first battery level threshold (for example, 50% of a total battery level). If the remaining battery level is less than the first battery level threshold, the mobile terminal 100 may set the Wi-Fi antenna working mode as SISO. If the remaining battery level is not less than the first battery level threshold, the mobile terminal 100 may set the Wi-Fi antenna working mode as MIMO. A period in which the mobile terminal 100 detects the remaining battery level and a period in which the mobile terminal 100 determines whether the remaining battery level is less than the first battery level threshold may be the same or may be different. This is not limited in embodiments of the present disclosure.
2. The mobile terminal 100 may periodically (for example, a period is 1 second) detect the device temperature, and determine whether the device temperature is greater than the first temperature threshold (for example, 60 degrees Celsius). If the device temperature is greater than the first temperature threshold, the mobile terminal 100 may set the Wi-Fi antenna working mode as SISO. If the device temperature is not greater than the first temperature threshold, the mobile terminal 100 may set the Wi-Fi antenna working mode as MIMO. A period in which the mobile terminal 100 detects the device temperature and a period in which the mobile terminal 100 determines whether the device temperature is greater than the first temperature threshold may be the same or may be different. This is not limited in embodiments of the present disclosure. A period in which the mobile terminal 100 detects the device temperature and a period in which the mobile terminal 100 determines whether the device temperature is greater than the first temperature threshold may be the same or may be different. This is not limited in embodiments of the present disclosure.
3. The mobile terminal 100 may periodically (for example, a period is 1 second) detect the remaining battery level and the device temperature, and determine whether the remaining battery level is less than the first battery level threshold (for example, 50% of a total battery level) or the device temperature is greater than the first temperature threshold (for example, 60 degrees Celsius). If the remaining battery level is less than the first battery level threshold or the device temperature is greater than the first temperature threshold, the mobile terminal 100 may set the Wi-Fi antenna working mode as SISO. If the remaining battery level is not less than the specified battery level threshold and the device temperature is not greater than the specified temperature threshold, the mobile terminal 100 may set the Wi-Fi antenna working mode as MIMO. A period in which the mobile terminal 100 detects the remaining battery level and the device temperature and a period in which the mobile terminal 100 determines whether the remaining battery level is less than the first battery level threshold or the device temperature is greater than the first temperature threshold may be the same or may be different. This is not limited in embodiments of the present disclosure.
4. The mobile terminal 100 may periodically (for example, a period is 1 second) detect the remaining battery level and the device temperature, and determine whether the remaining battery level is less than the first battery level threshold (for example, 50% of a total battery level) and the device temperature is greater than the first temperature threshold (for example, 60 degrees Celsius). If the remaining battery level is less than the first battery level threshold and the device temperature is greater than the first temperature threshold, the mobile terminal 100 may set the antenna working mode as SISO. If the remaining battery level is not less than the first battery level threshold or the device temperature is not greater than the first temperature threshold, the mobile terminal 100 may set the Wi-Fi antenna working mode as MIMO. A period in which the mobile terminal 100 detects the remaining battery level and the device temperature and a period in which the mobile terminal 100 determines whether the remaining battery level is less than the first battery level threshold and the device temperature is greater than the first temperature threshold may be the same or may be different. This is not limited in embodiments of the present disclosure.

In some embodiments, the mobile terminal 100 determines whether a high power consumption service is currently running (for example, a game application is running, a video is being played, a voice call is ongoing, or a video call is ongoing). If the high power consumption service is currently running, the mobile terminal 100 may set the Wi-Fi antenna working mode as SISO. In this way, when the high power consumption application is running, a quantity of working Wi-Fi antennas can be reduced, to reduce power consumption of the mobile terminal 100.

The following describes how the mobile terminal 100 switches the Wi-Fi antenna working mode in this embodiment of this application.

When the mobile terminal 100 serving as a Wi-Fi AP sends downlink data to a STA in a form of a plurality of spatial flows, if the STA works in only a single Wi-Fi antenna working mode, the STA cannot correctly receive the downlink data sent by the AP. Therefore, when switching the Wi-Fi antenna working mode, the mobile terminal 100 also needs to indicate the STA to switch the Wi-Fi antenna working mode.

When the mobile terminal 100 needs to switch the Wi-Fi antenna working mode from MIMO to SISO, the mobile terminal 100 may first send a first switching request to the STA. After sending the first switching request to the STA, the mobile terminal 100 may send downlink data to the STA by using a single antenna. After receiving the first switching request, the STA may receive, by using a single antenna, the data sent by the mobile terminal 100.

When the mobile terminal 100 needs to switch the Wi-Fi antenna working mode from SISO to MIMO, the mobile terminal 100 may first send a second switching request to the STA. After sending the second switching request to the STA, the mobile terminal 100 may send downlink data to the STA by using a plurality of antennas. After receiving the second switching request, the STA may receive, by using a plurality of antennas, the data sent by the mobile terminal 100.

In an application scenario, after enabling a Wi-Fi hotspot function, the mobile terminal 100 may monitor (that is, periodically detect) a remaining battery level of the mobile terminal 100. When the remaining battery level of the mobile terminal 100 is less than a specified battery level threshold, the mobile terminal 100 may limit a maximum forwarding rate of a transmission control protocol (TCP)

packet or a user datagram protocol (UDP) packet. In this way, power consumption of the mobile terminal 100 is reduced.

Figure 8:
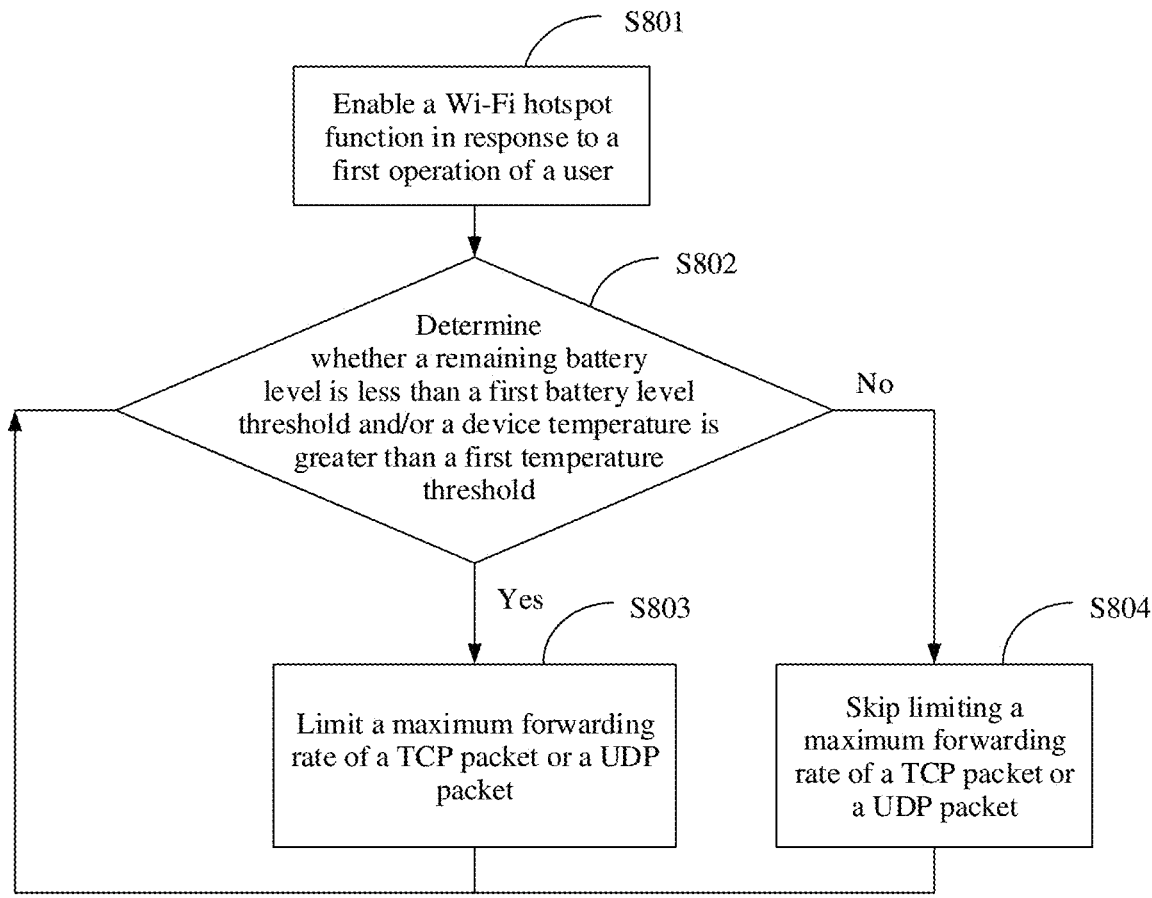
FIG. 8 is a schematic flowchart of a device control method according to another embodiment of this application.

FIG. 8 is a device control method according to an embodiment of this application. As shown in FIG. 8, the method includes the following steps.

S801: A mobile terminal 100 enables a Wi-Fi hotspot function in response to a first operation of a user.

For specific content, refer to step S401 in the embodiment shown in FIG. 4.

S802: The mobile terminal 100 may determine whether a remaining battery level of the mobile terminal 100 is less than a first battery level threshold and/or a device temperature of the mobile terminal 100 is greater than a first temperature threshold. If the remaining battery level of the mobile terminal 100 is less than the first battery level threshold and/or the device temperature of the mobile terminal 100 is greater than the first temperature threshold, the mobile terminal 100 may perform step S803 in which the mobile terminal 100 may limit a maximum forwarding rate of a TCP packet or a UDP packet. If the remaining battery level of the mobile terminal 100 is not less than the first battery level threshold and/or the device temperature of the mobile terminal 100 is not greater than the first temperature threshold, the mobile terminal 100 performs step S804 in which the mobile terminal 100 may cancel limiting a maximum forwarding rate of a TCP packet or a UDP packet.

There are the following cases in which the mobile terminal 100 determines whether the remaining battery level is less than the first battery level threshold and/or the device temperature is greater than the first temperature threshold:

1. The mobile terminal 100 may periodically (for example, a period is 1 second) detect the remaining battery level, and determine whether the remaining battery level is less than the first battery level threshold (for example, 50% of a total battery level). If the remaining battery level is less than the first battery level threshold, the mobile terminal 100 may limit the maximum forwarding rate of the TCP packet or the UDP packet. If the remaining battery level is not less than the first battery level threshold, the mobile terminal 100 may cancel limiting the maximum forwarding rate of the TCP packet or the UDP packet. A period in which the mobile terminal 100 detects the remaining battery level and a period in which the mobile terminal 100 determines whether the remaining battery level is less than the first battery level threshold may be the same or may be different. This is not limited in embodiments of the present disclosure.

2. The mobile terminal 100 may periodically (for example, a period is 1 second) detect the device temperature, and determine whether the remaining battery level is greater than the first temperature threshold (for example, 60 degrees Celsius). If the device temperature is greater than the first temperature threshold, the mobile terminal 100 may limit the maximum forwarding rate of the TCP packet or the UDP packet. If the device temperature is not greater than the first temperature threshold, the mobile terminal 100 cancels limiting the maximum forwarding rate of the TCP packet or the UDP packet. A period in which the mobile terminal 100 detects the device temperature and a period in which the mobile terminal 100 determines whether the device temperature is greater than the first temperature threshold may be the same or may be different. This is not limited in embodiments of the present disclosure. A period in which the mobile terminal 100 detects the device temperature and a period in which the mobile terminal 100 determines whether the device temperature is greater than the first temperature threshold may be the same or may be different. This is not limited in embodiments of the present disclosure.

3. The mobile terminal 100 may periodically (for example, a period is 1 second) detect the remaining battery level and the device temperature, and determine whether the remaining battery level is less than the first battery level threshold (for example, 50% of a total battery level) or the device temperature is greater than the first temperature threshold (for example, 60 degrees Celsius). If the remaining battery level is less than the first battery level threshold or the device temperature is greater than the first temperature threshold, the mobile terminal 100 may limit the maximum forwarding rate of the TCP packet or the UDP packet. If the remaining battery level is not less than the first battery level threshold and the device temperature is not greater than the first temperature threshold, the mobile terminal 100 cancels limiting the maximum forwarding rate of the TCP packet or the UDP packet. A period in which the mobile terminal 100 detects the remaining battery level and the device temperature and a period in which the mobile terminal 100 determines whether the remaining battery level is less than the first battery level threshold or the device temperature is greater than the first temperature threshold may be the same or may be different. This is not limited in embodiments of the present disclosure.

4. The mobile terminal 100 may periodically (for example, a period is 1 second) detect the remaining battery level and the device temperature, and determine whether the remaining battery level is less than the first battery level threshold (for example, 50% of a total battery level) and the device temperature is greater than the first temperature threshold (for example, 60 degrees Celsius). If the remaining battery level is less than the first battery level threshold and the device temperature is greater than the first temperature threshold, the mobile terminal 100 may limit the maximum forwarding rate of the TCP packet or the UDP packet. If the remaining battery level is not less than the first battery level threshold or the device temperature is not greater than the first temperature threshold, the mobile terminal 100 cancels limiting the maximum forwarding rate of the TCP packet or the UDP packet. A period in which the mobile terminal 100 detects the remaining battery level and the device temperature and a period in which the mobile terminal 100 determines whether the remaining battery level is less than the first battery level threshold and the device temperature is greater than the first temperature threshold may be the same or may be different. This is not limited in embodiments of the present disclosure.

In this embodiment of this application, that the mobile terminal 100 limits the maximum forwarding rate of the TCP packet or the UDP packet includes that the mobile terminal 100 limits the forwarding rate of the TCP packet or the UDP packet not to exceed a specified rate threshold.

In some embodiments, the mobile terminal 100 determines whether a high power consumption service is currently running (for example, a game application is running, a video is being played, a voice call is ongoing, or a video call is ongoing). If the high power consumption service is currently running, the mobile terminal 100 may limit the maximum forwarding rate of the TCP packet or the UDP packet to a first rate threshold. In this way, when the high power consumption application is running, the forwarding rate of the TCP packet or the UDP packet can be limited, to reduce power consumption of the mobile terminal 100.

In a possible implementation, a plurality of STAs are connected to the mobile terminal 100, and the mobile terminal 100 may further limit a forwarding rate of a TCP packet or a UDP packet forwarded to a specific STA not to exceed a first rate threshold.

For example, after enabling a Wi-Fi hotspot, the mobile terminal 100 may establish Wi-Fi connections to a STA 1, a STA 2, and a STA 3. When the remaining battery level of the mobile terminal 100 is less than a specified battery level threshold and/or the device temperature of the mobile terminal 100 is greater than a specified temperature threshold, because a rate of a TCP packet or a UDP packet currently forwarded by the mobile terminal 100 to the STA 1 is the highest, the mobile terminal 100 may limit the forwarding rate of the TCP packet or the UDP packet forwarded to the STA 1 not to exceed the first rate threshold.

In a possible implementation, when the remaining battery level of the mobile terminal 100 is less than the first battery level threshold (for example, 50% of a total battery level) and/or the device temperature of the mobile terminal 100 is greater than the first temperature threshold (for example, 60 degrees Celsius), the mobile terminal 100 may limit the maximum forwarding rate of the TCP packet or the UDP packet in a unit time to a first rate threshold. When the remaining battery level of the mobile terminal 100 is less than a second battery level threshold (for example, 20% of a total battery level) and/or the device temperature of the mobile terminal 100 is greater than a second temperature threshold (for example, 75 degrees Celsius), the mobile terminal 100 may limit the maximum forwarding rate of the TCP packet or the UDP packet to a second rate threshold. The first battery level threshold is greater than the second battery level threshold, the first temperature threshold is less than the second temperature threshold, and the first rate threshold is greater than the second rate threshold. In this way, the maximum forwarding rate of the TCP packet or the UDP packet is adjusted in a gradient manner based on the remaining battery level and/or the device temperature, so that transmission performance and power consumption of the first mobile terminal can be balanced.

In some application scenarios, after the mobile terminal 100 enables a Wi-Fi hotspot function, when a remaining battery level of the mobile terminal 100 is less than a specified battery level threshold and/or a device temperature of the mobile terminal 100 is greater than a specified temperature threshold, the mobile terminal 100 may simultaneously execute the following low power consumption policies. The low power consumption policies include the following: 1. The mobile terminal 100 limits a response to a probe request. 2. The mobile terminal 100 sets a Wi-Fi antenna working mode as SISO. 3. The mobile terminal 100 limits a maximum forwarding rate of a TCP packet or a UDP packet. For descriptions of the low power consumption policies, refer to the embodiments shown in FIG. 4, FIG. 7, and FIG. 8.

For example, when the remaining battery level of the mobile terminal 100 is less than the first battery level threshold and/or the device temperature of the mobile terminal 100 is greater than the first temperature threshold, the mobile terminal 100 may limit the response to the probe request, and set the Wi-Fi antenna working mode as SISO. For another example, when the remaining battery level of the mobile terminal 100 is less than the first battery level threshold and/or the device temperature of the mobile terminal 100 is greater than the first temperature threshold, the mobile terminal 100 may limit the response to the probe request, and limit a quantity of TCP packets or UDP packets forwarded in a unit time. For another example, when the remaining battery level of the mobile terminal 100 is less than the first battery level threshold and/or the device temperature of the mobile terminal 100 is greater than the first temperature threshold, the mobile terminal 100 may set the Wi-Fi antenna working mode as SISO, and limit the maximum forwarding rate of the TCP packet or the UDP packet. For another example, when the remaining battery level of the mobile terminal 100 is less than the first battery level threshold and/or the device temperature of the mobile terminal 100 is greater than the first temperature threshold, the mobile terminal 100 may limit the response to the probe request, set the Wi-Fi antenna working mode as SISO, and limit the maximum forwarding rate of the TCP packet or the UDP packet.

Specifically, after the mobile terminal 100 enables the Wi-Fi hotspot function, when the remaining battery level of the mobile terminal 100 is less than 50% of a total battery level or the device temperature of the mobile terminal 100 is greater than 50 degrees Celsius, the mobile terminal 100 may simultaneously execute the following low power consumption policies: 1. The mobile terminal 100 limits a response to a probe request. 2. The mobile terminal 100 sets a Wi-Fi antenna working mode as SISO. 3. The mobile terminal 100 limits a maximum forwarding rate of a TCP packet or a UDP packet. For detailed descriptions that the mobile terminal 100 limits the response to the probe request, refer to the embodiment shown in FIG. 4. For detailed descriptions that the mobile terminal 100 sets the Wi-Fi antenna working mode as SISO, refer to the embodiment shown in FIG. 7. For descriptions that the mobile terminal 100 limits the quantity of TCP packets or UDP packets forwarded in the unit time, refer to the embodiment shown in FIG. 8.

Figure 9:
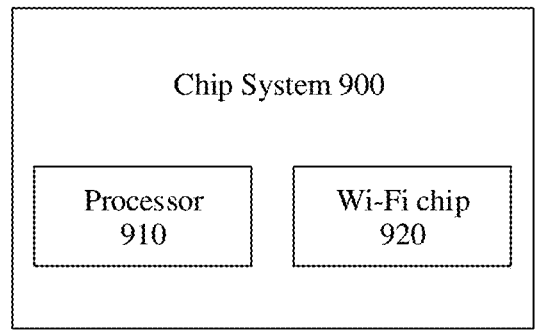
FIG. 9 is a schematic diagram of a structure of a chip system according to an embodiment of this application.

FIG. 9 is a chip system 900 according to an embodiment of this application.

As shown in FIG. 9, the chip system 900 may include a processor 910 and a Wi-Fi chip 920. The chip system 900 may be disposed in a first mobile terminal (a mobile terminal 100).

The Wi-Fi chip 920 is configured to: after a wireless hotspot function is enabled, establish a wireless fidelity (Wi-Fi) connection to a second mobile terminal (Wi-Fi STA), and transmit data to the second mobile terminal (Wi-Fi STA) in a multiple-input multiple-output (MIMO) Wi-Fi antenna working mode. The processor 910 is configured to: after the wireless hotspot function is enabled, indicate a power management module to monitor a remaining battery level of the first mobile terminal, and/or indicate a temperature sensor to monitor a device temperature of the first mobile terminal. The processor 910 is further configured to: when the remaining battery level is less than a first battery level threshold and/or the device temperature is less than a first device temperature threshold, send a first instruction to the Wi-Fi chip. The Wi-Fi chip 920 is further configured to: in response to the first instruction, switch to a single-input single-output (SISO) Wi-Fi antenna working mode, and/or limit a maximum forwarding rate of a TCP packet or a UDP packet to less than a first rate, and/or no longer respond to a probe request.

In a possible implementation, the processor is further configured to: when a quantity of terminal devices connected to the first mobile terminal through Wi-Fi reaches a specified value, send a second instruction to the Wi-Fi chip 920. The Wi-Fi chip 920 is further configured to no longer respond to the probe request in response to the second instruction. In this way, the quantity of devices accessed by the first mobile terminal through Wi-Fi can be limited, to reduce power consumption.

In a possible implementation, the processor 910 is further configured to: when the remaining battery level is less than a second battery level threshold, send a third instruction to the Wi-Fi chip 920. The Wi-Fi chip 920 is further configured to limit the maximum forwarding rate of the TCP packet or the UDP packet to a second rate in response to the third instruction. The second battery level threshold is less than the first battery level threshold, and the second rate is less than the first rate. In this way, the maximum forwarding rate of the TCP packet or the UDP packet is adjusted in a gradient manner based on the remaining battery level, so that transmission performance and power consumption of the first mobile terminal can be balanced.

In a possible implementation, the processor 910 is further configured to: when the device temperature is greater than a second temperature threshold, send a fourth instruction to the Wi-Fi chip 920. The Wi-Fi chip 920 is further configured to limit the maximum forwarding rate of the TCP packet or the UDP packet to a second rate in response to the fourth instruction, where the second temperature threshold is greater than the first temperature threshold, and the second rate is less than the first rate. In this way, the maximum forwarding rate of the TCP packet or the UDP packet is adjusted in a gradient manner based on the device temperature, so that transmission performance and power consumption of the first mobile terminal can be balanced.

In a possible implementation, the processor 910 is further configured to: when detecting that a preset high power consumption application is running, send a fifth instruction to the Wi-Fi chip. The Wi-Fi chip 920 is further configured to: in response to the fifth instruction, switch the Wi-Fi antenna working mode to SISO, and/or limit the maximum forwarding rate of the TCP packet or the UDP packet to the first rate, and/or no longer respond to the probe request. In this way, when the high power consumption application is running, the Wi-Fi chip can reduce a quantity of working Wi-Fi antennas, limit the forwarding rate of the TCP packet or the UDP packet, and no longer respond to the probe request, to reduce power consumption of the first mobile terminal.

In a possible implementation, the processor 910 is further configured to: before the Wi-Fi chip 920 switches the Wi-Fi antenna working mode to SISO, send a sixth instruction to the Wi-Fi chip 920. The Wi-Fi chip 920 is further configured to send a first switching request to the second mobile terminal in response to the sixth instruction, where the first switching request is used to request the second mobile terminal to switch the Wi-Fi working mode to SISO.

In a possible implementation, the specified value includes a maximum access quantity supported by the Wi-Fi chip 920. In this way, due to a limitation of the Wi-Fi chip 920 or the like, there is a maximum quantity of (for example, a maximum of eight) STAs accessed by the first mobile terminal serving as a Wi-Fi hotspot AP. When the specified quantity is set to the maximum quantity of STAs accessed by the first mobile terminal, the first mobile terminal cannot actually access more STAs. Therefore, a response to the probe request is limited, and an association success rate of the Wi-Fi hotspot is not affected.

The foregoing embodiments are merely intended to describe the technical solutions of this application, but not to limit this application. Although this application is described in detail with reference to the foregoing embodiments, a person of ordinary skill in the art should understand that they may still make modifications to the technical solutions recorded in the foregoing embodiments or make equivalent replacements to some technical features thereof without departing from the scope of the technical solutions of the embodiments of this application.

What is claimed is:

1. A device control system, comprising a first mobile terminal and a second mobile terminal, wherein
the first mobile terminal is configured to:
after enabling a wireless hotspot function, establish a wireless fidelity (Wi-Fi) connection to the second mobile terminal, and transmit data to the second mobile terminal in a multiple-input multiple-output (MIMO) Wi-Fi antenna working mode in which a Wi-Fi antenna working mode is set to MIMO;
monitor a remaining battery level and/or a device temperature of the first mobile terminal; and
upon determining that the remaining battery level is less than a first battery level threshold and the device temperature is greater than a first temperature threshold, simultaneously execute low power consumption operations including: 1) switching the Wi-Fi antenna working mode to single-input single-output (SISO), 2) limiting a maximum forwarding rate of a transmission control protocol (TCP) packet or a user datagram protocol (UDP) packet to a first rate, and 3) stopping responding to a probe request, and
the second mobile terminal is configured to access the internet by using the first mobile terminal connected through Wi-Fi.

2. The system according to claim 1, wherein the first mobile terminal is further configured to:
upon determining that a quantity of terminal devices connected to the first mobile terminal through Wi-Fi reaches a specified value, stop responding to a probe request.

3. The system according to claim 1, wherein the first mobile terminal is further configured to:
upon determining that the remaining battery level is less than a second battery level threshold, limit the maximum forwarding rate of the TCP packet or the UDP packet to a second rate, wherein the second battery level threshold is less than the first battery level threshold, and the second rate is less than the first rate.

4. The system according to claim 1, wherein the first mobile terminal is further configured to:
upon determining that the device temperature is greater than a second temperature threshold, limit the maximum forwarding rate of the TCP packet or the UDP packet to a second rate, wherein the second temperature threshold is greater than the first temperature threshold.

5. The system according to claim 1, wherein the first mobile terminal is further configured to:
upon detecting that a preset high power consumption application is running, switch the Wi-Fi antenna working mode to SISO, limit the maximum forwarding rate of the TCP packet or the UDP packet to the first rate, and/or stop responding to the probe request.

6. The system according to claim 1, wherein the first mobile terminal is further configured to:
before switching the Wi-Fi antenna working mode to SISO, send a first switching request to the second mobile terminal; and the second mobile terminal is further configured to switch the Wi-Fi antenna working mode to SISO in response to the first switching request.

7. The system according to claim 2, wherein the specified value comprises a maximum access quantity supported by a Wi-Fi chip of the first mobile terminal.

8. A chip system, comprising a processor and a wireless fidelity (Wi-Fi) chip, wherein the chip system is disposed in a first mobile terminal,
the Wi-Fi chip is configured to after a wireless hotspot function is enabled, establish a wireless fidelity (Wi-Fi) connection to a second mobile terminal, and transmit data to the second mobile terminal in a multiple-input multiple-output (MIMO) Wi-Fi antenna working mode in which a Wi-Fi antenna working mode is set to MIMO,
the processor is configured to:
after the wireless hotspot function is enabled, indicate a power management module to monitor a remaining battery level of the first mobile terminal, and/or indicate a temperature sensor to monitor a device temperature of the first mobile terminal; and
upon determining that the remaining battery level is less than a first battery level threshold and the device temperature is greater than a first device temperature threshold, send a first instruction to the Wi-Fi chip, and
the Wi-Fi chip is further configured to: in response to the first instruction, simultaneously execute low power consumption operations including: 1) switching the Wi-Fi antenna working mode to single-input single-output (SISO), 2) limiting a maximum forwarding rate of a TCP packet or a UDP packet to a first rate, and 3) stopping responding to a probe request.

9. The chip system according to claim 8, wherein the processor is further configured to:
upon determining that a quantity of terminal devices connected to the first mobile terminal through Wi-Fi reaches a specified value, send a second instruction to the Wi-Fi chip, and
the Wi-Fi chip is further configured to stop responding to the probe request in response to the second instruction.

10. The chip system according to claim 8, wherein the processor is further configured to:
upon determining that the remaining battery level is less than a second battery level threshold, send a third instruction to the Wi-Fi chip, and
the Wi-Fi chip is further configured to limit the maximum forwarding rate of the TCP packet or the UDP packet to a second rate in response to the third instruction, wherein the second battery level threshold is less than the first battery level threshold, and the second rate is less than the first rate.

11. The chip system according to claim 8, wherein the processor is further configured to:
upon determining that the device temperature is greater than a second temperature threshold, send a fourth instruction to the Wi-Fi chip, and
the Wi-Fi chip is further configured to limit the maximum forwarding rate of the TCP packet or the UDP packet to a second rate in response to the fourth instruction, wherein the second temperature threshold is greater than the first device temperature threshold, and the second rate is less than the first rate.

12. The chip system according to claim 8, wherein the processor is further configured to:

upon detecting that a preset high power consumption application is running, send a fifth instruction to the Wi-Fi chip; and
the Wi-Fi chip is further configured to: in response to the fifth instruction, switch the Wi-Fi antenna working mode to SISO, limit the maximum forwarding rate of the TCP packet or the UDP packet to the first rate, and/or stop responding to the probe request.

13. The chip system according to claim 8, wherein the processor is further configured to:
before the Wi-Fi chip switches the Wi-Fi antenna working mode to SISO, send a sixth instruction to the Wi-Fi chip, and
the Wi-Fi chip is further configured to send a first switching request to the second mobile terminal in response to the sixth instruction, wherein the first switching request requests the second mobile terminal to switch the Wi-Fi antenna working mode to SISO.

14. The chip system according to claim 9, wherein the specified value comprises a maximum access quantity supported by the Wi-Fi chip.

15. A device control method, comprising:
after enabling a wireless hotspot function, establishing, by a first mobile terminal, a wireless fidelity (Wi-Fi) connection to a second mobile terminal, and transmitting data to the second mobile terminal in a multiple-input multiple-output (MIMO) Wi-Fi antenna working mode in which a Wi-Fi antenna working mode is set to MIMO, wherein the second mobile terminal is configured to access the internet by using the first mobile terminal connected through Wi-Fi;
monitoring, by the first mobile terminal, a remaining battery level and/or a device temperature of the first mobile terminal; and
upon determining that the remaining battery level is less than a first battery level threshold and the device temperature is greater than a first temperature threshold, simultaneously executing low power consumption operations including: 1) switching, by the first mobile terminal,
the Wi-Fi antenna working mode to single-input single-output (SISO), 2) limiting a maximum forwarding rate of a transmission control protocol (TCP) packet or a user datagram protocol (UDP) packet to a first rate, and 3) stopping responding to a probe request.

16. The method according to claim 15, further comprising:
upon determining that a quantity of terminal devices connected to the first mobile terminal through Wi-Fi reaches a specified value, stopping responding, by the first mobile terminal, to the probe request.

17. The method according to claim 15, further comprising:
upon determining that the remaining battery level is less than a second battery level threshold, limiting, by the first mobile terminal, the maximum forwarding rate of the TCP packet or the UDP packet to a second rate, wherein the second battery level threshold is less than the first battery level threshold, and the second rate is less than the first rate.

18. The method according to claim 15, further comprising:
upon determining that the device temperature is greater than a second temperature threshold, limiting, by the first mobile terminal, the maximum forwarding rate of the TCP packet or the UDP packet to a second rate, wherein the second temperature threshold is greater than the first temperature threshold.

19. The method according to claim 15, further comprising:

upon determining that the first mobile terminal detects that a preset high power consumption application is running, switching, by the first mobile terminal, the Wi-Fi antenna working mode to SISO, limiting the maximum forwarding rate of the TCP packet or the UDP packet to the first rate, and/or stopping responding to the probe request.

20. The method according to claim 15, further comprising:

before switching the Wi-Fi antenna working mode to SISO, sending, by the first mobile terminal, a first switching request to the second mobile terminal, wherein the first switching request requests the second mobile terminal to switch the Wi-Fi antenna working mode to SISO.

* * * * *